(12) United States Patent
Imajuku et al.

(10) Patent No.: US 7,012,740 B2
(45) Date of Patent: Mar. 14, 2006

(54) OPTICAL PARAMETRIC CIRCUIT

(75) Inventors: Wataru Imajuku, Yokohama (JP); Kunihiko Mori, Yokosuka (JP); Atsushi Takada, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/983,259

(22) Filed: Nov. 4, 2004

(65) Prior Publication Data

US 2005/0094249 A1    May 5, 2005

Related U.S. Application Data

(62) Division of application No. 09/812,759, filed on Mar. 20, 2001, now Pat. No. 6,867,903.

(30) Foreign Application Priority Data

Mar. 21, 2000 (JP) ............................ 2000-078682
Oct. 4, 2000 (JP) ............................ 2000-304936

(51) Int. Cl.
*G02F 1/39* (2006.01)
*G02F 1/365* (2006.01)

(52) U.S. Cl. ..................... 359/330; 359/332
(58) Field of Classification Search ......... 359/326–332
See application file for complete search history.

(56) References Cited

U.S. PATENT DOCUMENTS

| | | | |
|---|---|---|---|
| 5,604,618 A * | 2/1997 | Mori et al. | 398/150 |
| 5,619,368 A | 4/1997 | Swanson | 359/326 |
| 6,487,004 B1 | 11/2002 | Strutz et al. | 359/326 |
| 6,501,591 B1 * | 12/2002 | Kumar et al. | 359/330 |
| 6,867,903 B1 * | 3/2005 | Imajuku et al. | 359/330 |
| 2002/0176152 A1 | 11/2002 | Parolari et al. | 359/326 |

FOREIGN PATENT DOCUMENTS

| | | |
|---|---|---|
| JP | 8-110538 | 4/1996 |
| JP | 8-146479 | 6/1996 |
| JP | 9-33967 | 2/1997 |
| JP | 10-319454 | 12/1998 |
| JP | 2000-10136 | 1/2000 |
| JP | 2000-221548 | 8/2000 |
| JP | 2001125159 | 5/2001 |

OTHER PUBLICATIONS

Torounidis et al, "Applications Of Fiber Optical Parametric Amplifiers", one page.*

Hyuek Jae Lee, et al., "Wavelength Dependent Performance of a Wavelength Converter Based on Cross-Grain Modulation and Birefringence of a Semiconductor Optical Amplifire," IEEE Photonics Technology Letters, vol. 11, No. 2, Feb. 1999, pp. 185-187.

(Continued)

*Primary Examiner*—John D. Lee
(74) *Attorney, Agent, or Firm*—Kenyon & Kenyon

(57) ABSTRACT

An optical parametric circuit including an optical coupler including a first output port and a second output port, and a nonlinear loop mirror on which an optical path which connects the first output port and the second output port is formed, in which the nonlinear loop mirror includes an optical dispersive medium and a second-order optical nonlinear medium through which the optical path passes, and in which an order of placement of the optical dispersive medium and the second-order optical nonlinear medium on the optical path in one direction from the first output port to the second output port is the reverse of an order of placement of the optical dispersive medium and the second-order optical nonlinear medium on the optical path in another direction from the second output port to the first output port.

11 Claims, 33 Drawing Sheets

OTHER PUBLICATIONS

S.L. Danielson, et al., "All Optical Wavelength Conversion Schemes for Increased Input Power Dynamic Range," IEEE Photonics Technology Letters, vol. 10, No. 1, Jan. 1998, pp. 60-62.

M.W.K. Mak and H.K. Tsang, polarisation-intensrive widely tunable wavelength converter using a single semiconductor optical amplifier, Electronics Letters, Jan. 20, 2000, vol. 36, No. 2, pp. 152-153.

Kyo Inoue, "Four-Wave Mixing in an Optical Fiber in the Zero-Dispersion Wavelength Region," Journal of Lightwave Technology, vol. 10, No. 11, Nov. 1992, p. 1553.

M.H. Chou, et al., "Efficient Wide-Band and Tunable Midspan Spectral Inverter Using Cascaded Nonlinearities in $LiNbO_3$ Waveguides," IEEE, Photonics Technology Letters, vol. 12, No. 1, Jan. 2000, pp. 82-84.

Wataru Imajuku, et al., "Proposal of parametric wavelength conversion circuit for the grouped wavelength path routing,", Proceedings of the 2001 IEICE General Conference, B-10-111, Mar. 7, 2001 (with English translation).

J. Leuthold et al. "Polarization Independent Optical Phase Conjugation with Pump-Signal Filtering in a Monolithically Integrated Mach-Zehnder Interferometer Semiconductor Optical Amplifier Configuration" IEEE Photonics Technology Letters, vol. 10, No. 11, Nov. 1998, pp. 1569-1571.

K. Mori et al. "Optical Parametric Loop Mirror" Optics Letters, Optical Society of America, Washington, US, vol. 20, No. 12, Jun. 15, 1995, pp. 1424-1426.

G. P. Banfi et al. "Wavelength Shifting and Amplification of Optical Pulses Through Cascaded Second-Order Processes in Periodically Poled Lithium Niobate" Applied Physics Letters, American Institute of Physics. New York, US, vol. 73, No. 2, Jul. 13, 1998, pp. 136-138.

M. H. Chou et al. "1.5$\mu$m-Band Wavelength Conversion Based on Cascaded Second-Order Nonlinearity in $LiNbO_3$ Waveguides" IEEE Photonics Technology Letters, IEEE Inc. New York, US, vol. 11, No. 6, Jun. 1999, pp. 653-655.

European Search Report, Nov. 13, 2003.

Shinji Koh et al., "GaAs/Ge/GaAs Sublattice Reversal Epitaxy on GaAs (100) and (111) Substrates for nonlinear Optical Devices", Japanese Journal of Applied Physics, vol. 38, L508-L511, 1999.

* cited by examiner

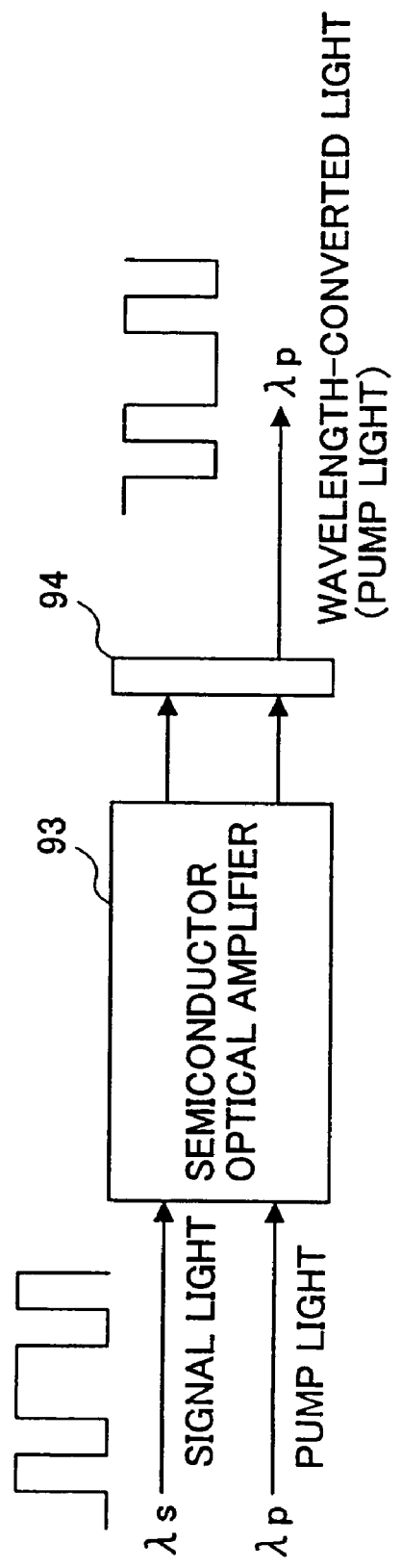

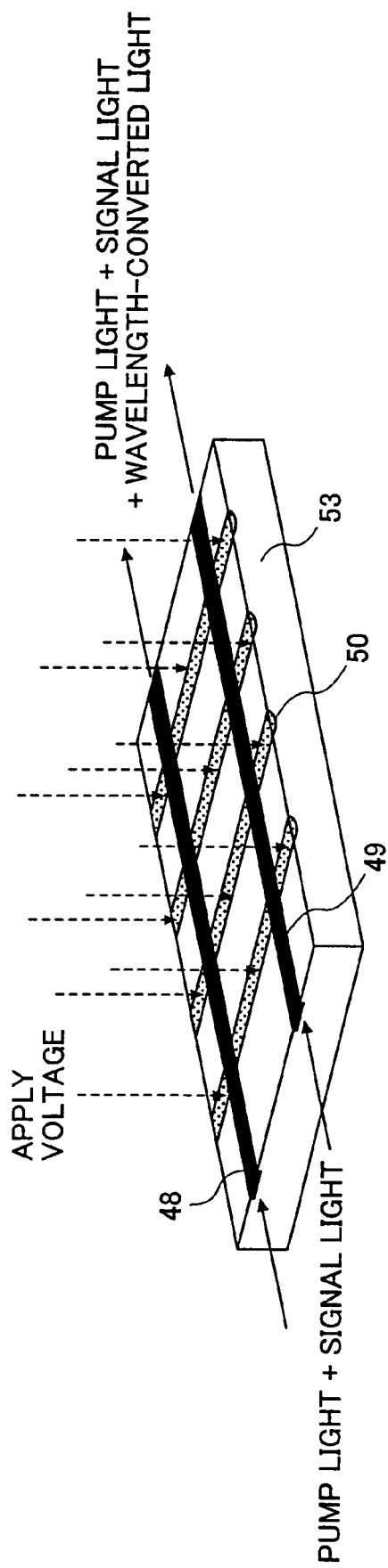

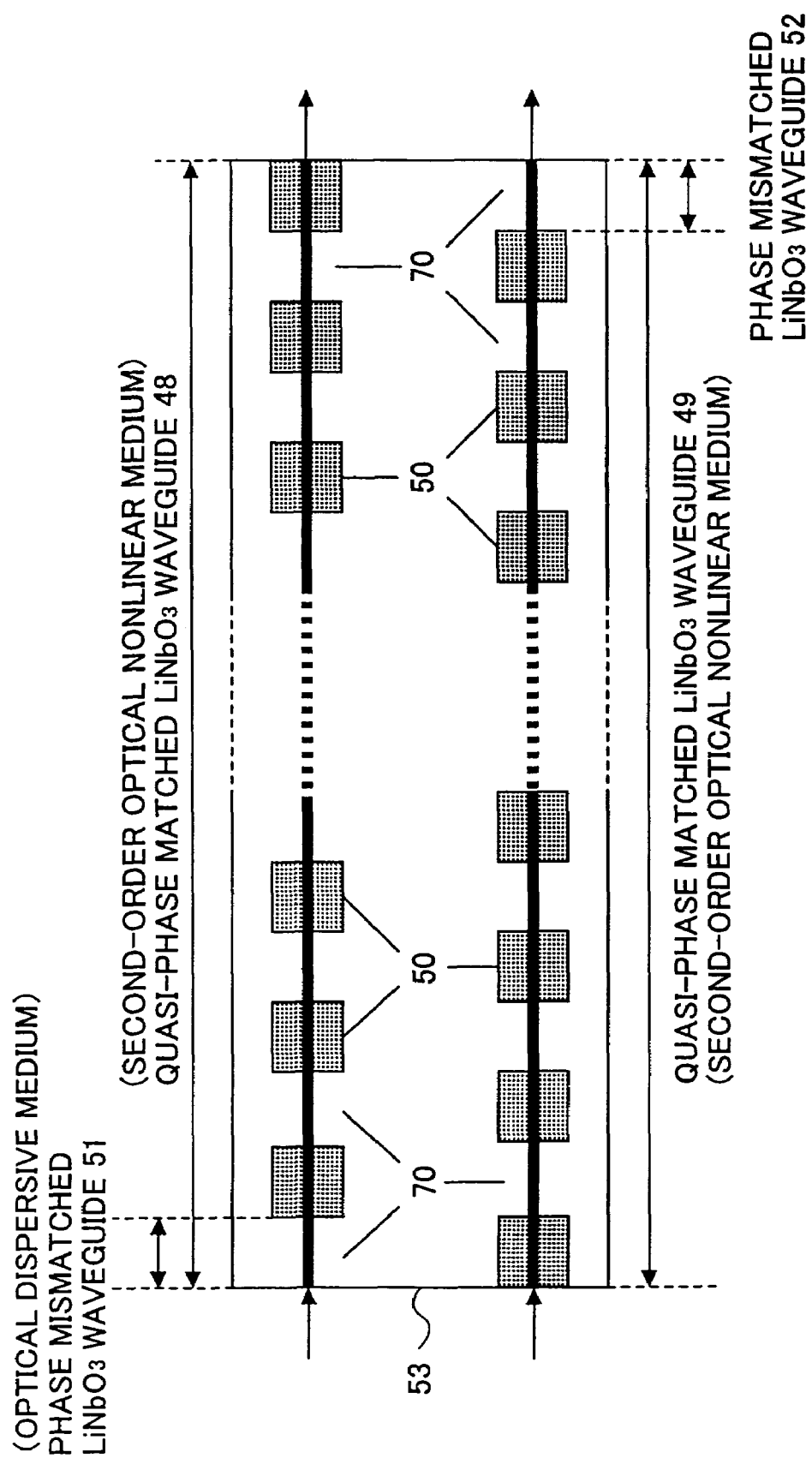

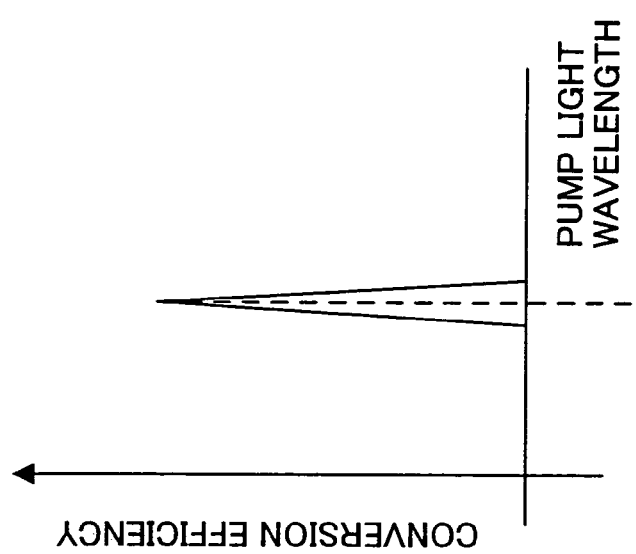
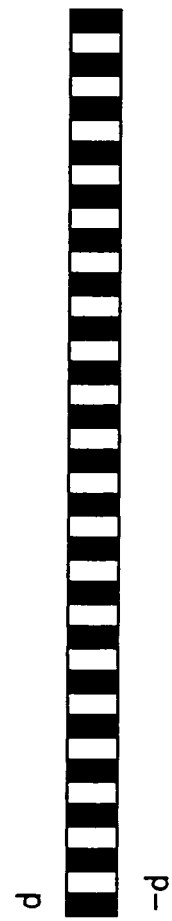

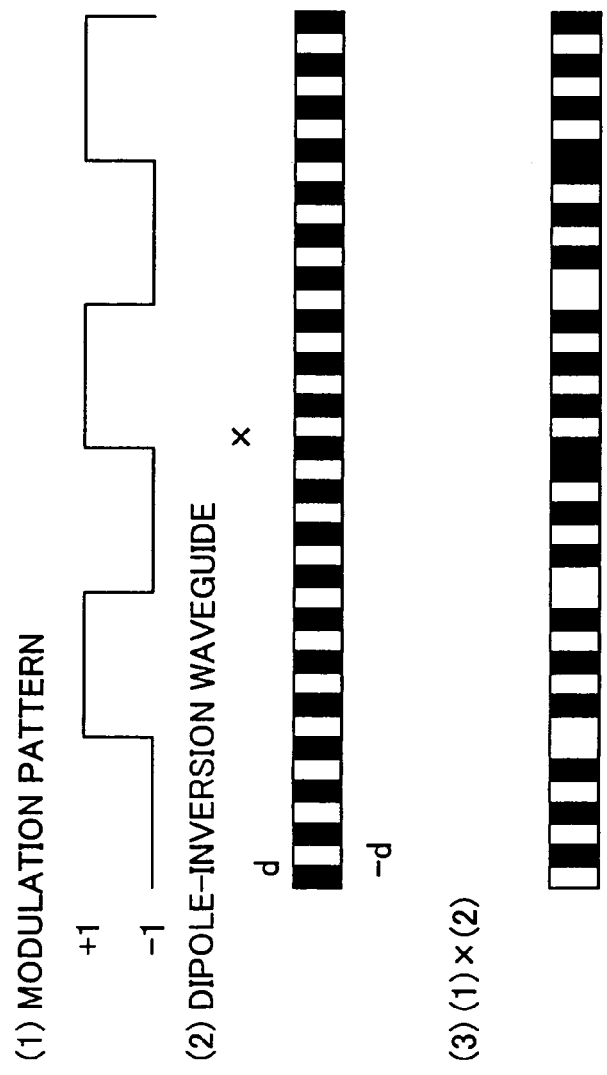
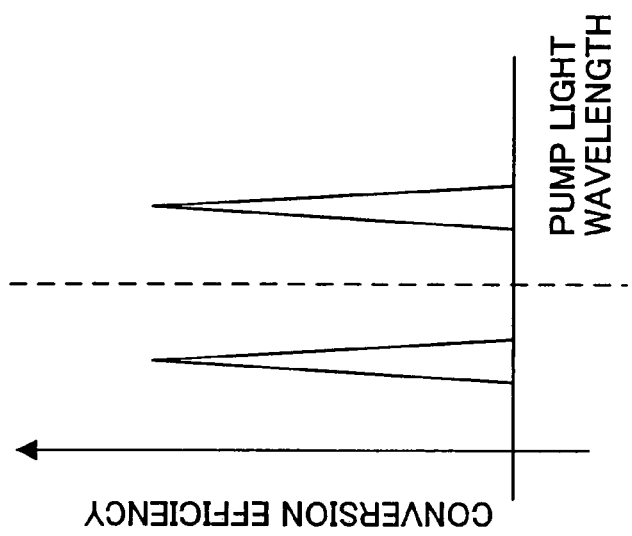
FIG.12A
FIG.12B

FIG.13A (1) MODULATION PATTERN (2) DIPOLE-INVERSION WAVEGUIDE (3) (1)×(2)

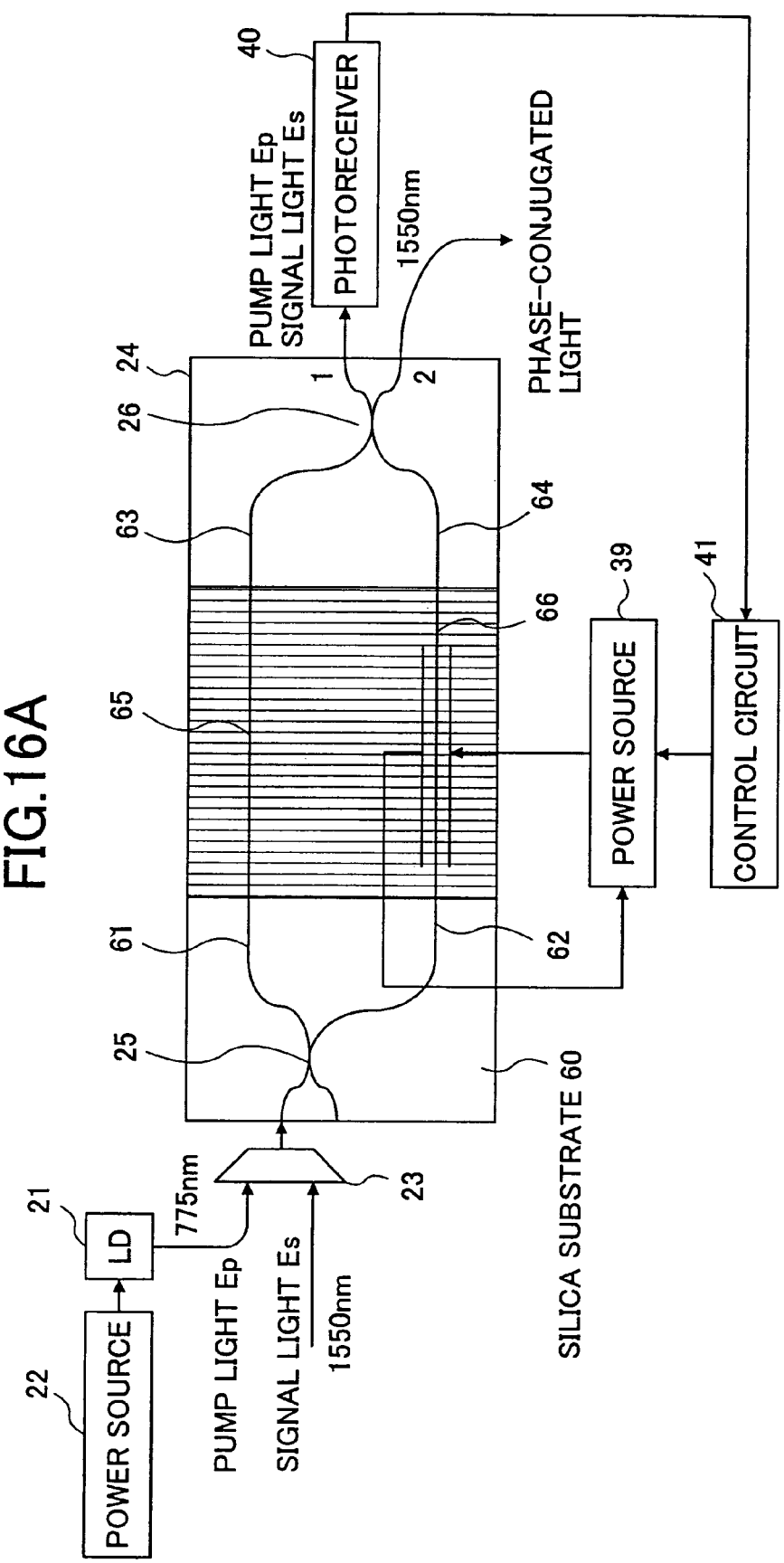

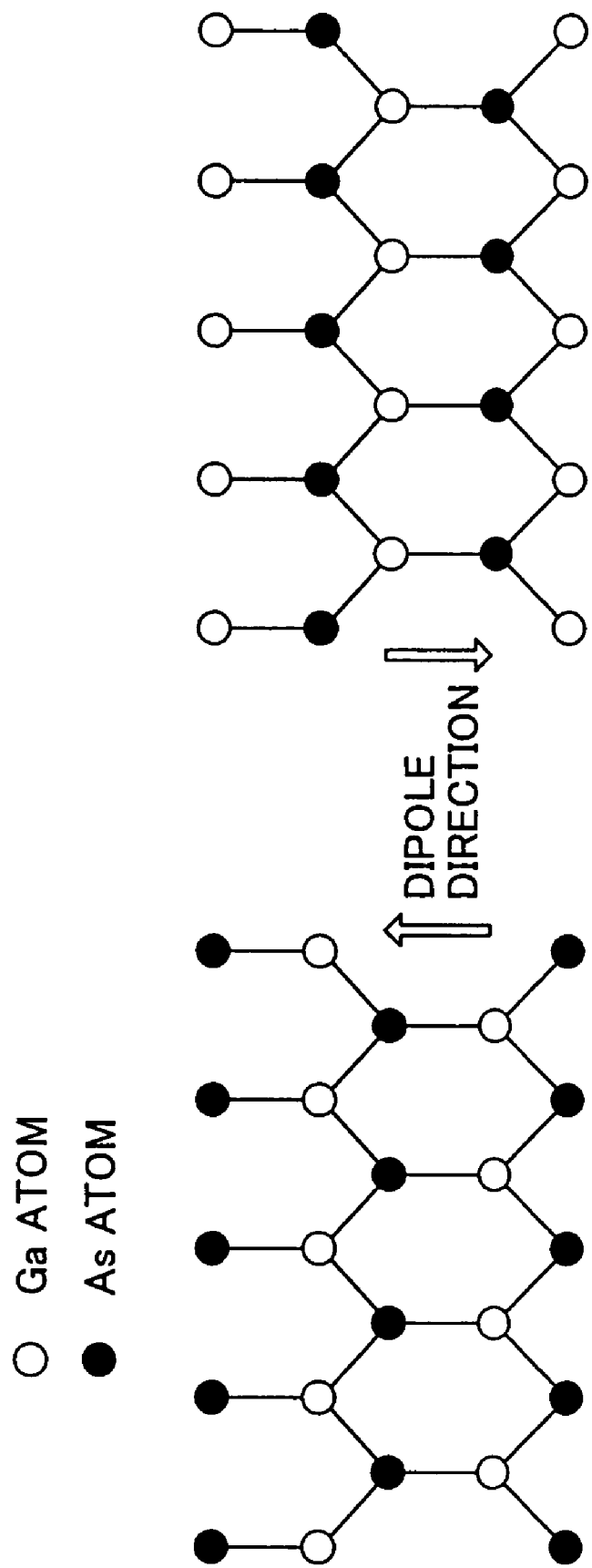

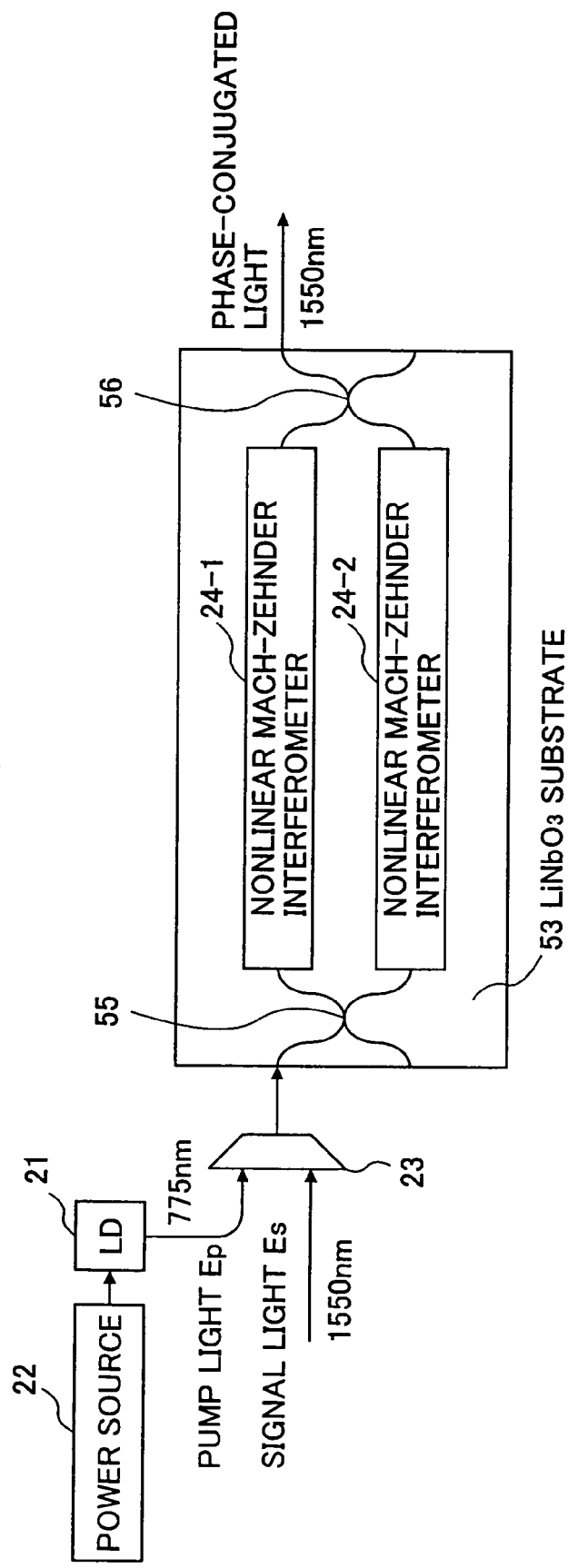

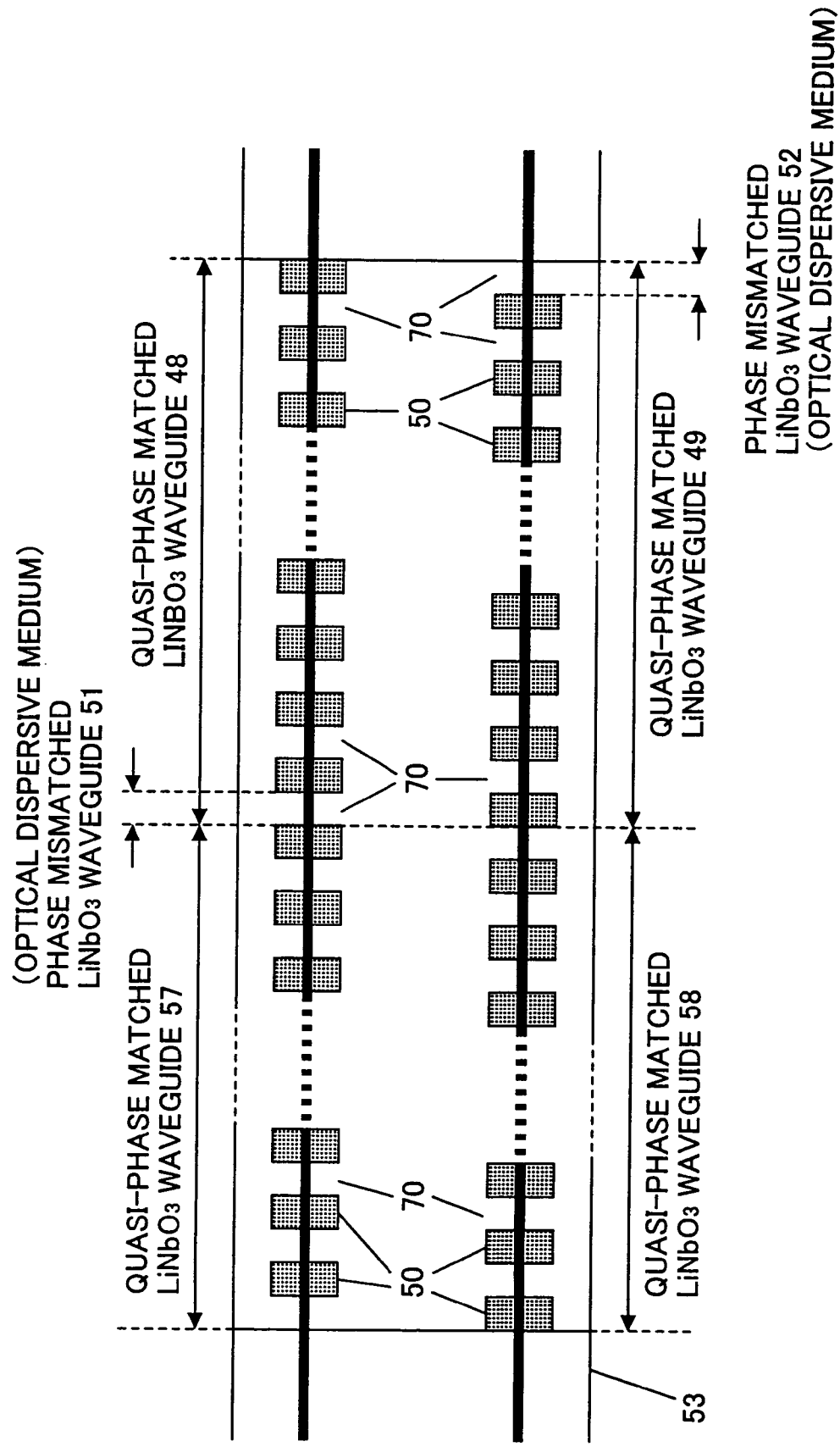

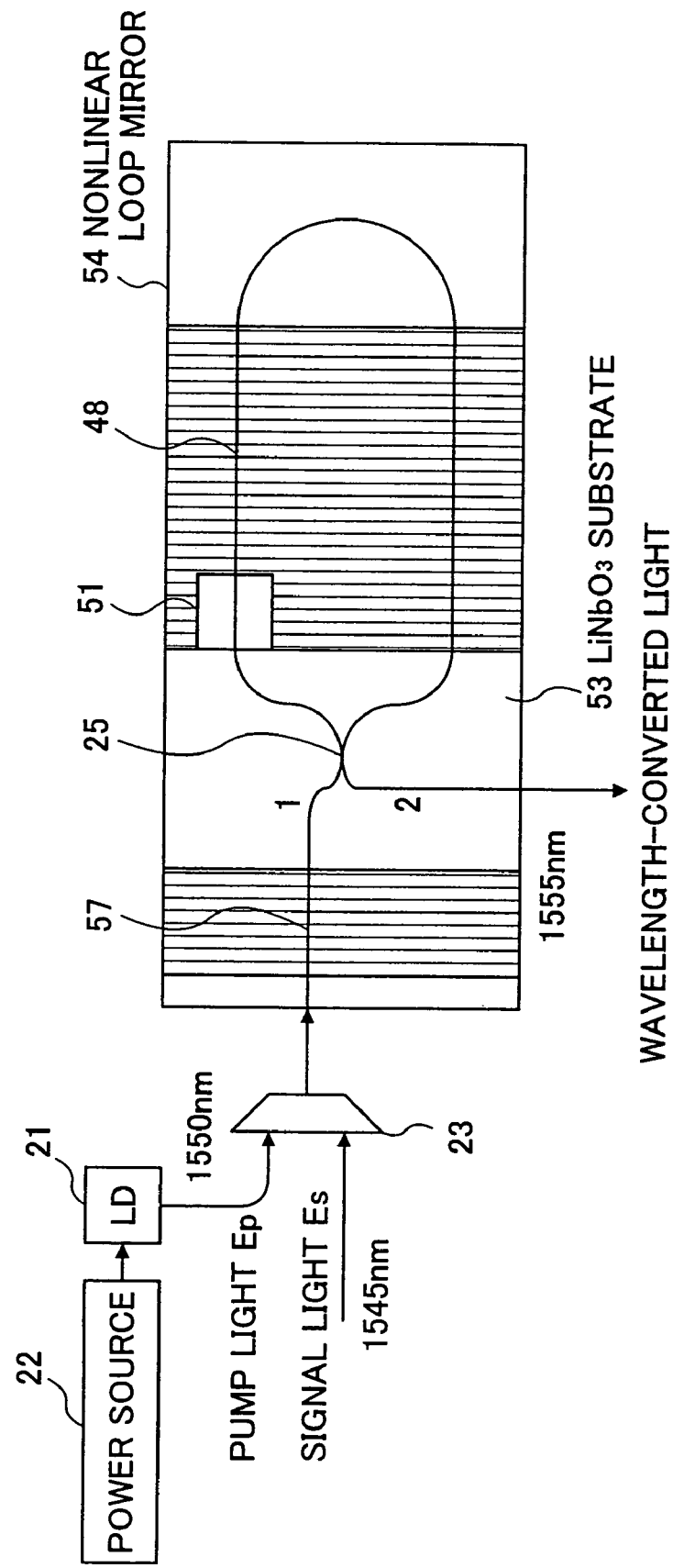

OPTICAL PARAMETRIC CIRCUIT

RELATED/PRIORITY APPLICATION INFORMATION

This application claims the benefit and priority of and is a division of U.S. Pat. No. 6,867,903, which issued on Mar. 15, 2005 from U.S. patent application Ser. No. 09/812,759, filed Mar. 20, 2001, which claims foreign priority benefits under 35 U.S.C. § 119 of Japanese Patent Application No. 2000-078682, filed Mar. 21, 2000 and Japanese Patent Application Ser. No. 2000-304936, filed Oct. 4, 2000, all of which are incorporated herein by reference.

BACKGROUND OF THE INVENTION

1. Field of the Invention

The present invention relates to an optical parametric circuit which outputs a wavelength-converted light or a phase-conjugated light of an input signal light by using optical parametric effect of optical nonlinear mediums, and which can amplify these lights.

2. Description of the Related Art

In recent years, elements which can convert a wavelength of light without converting the light into an electric signal have been developed. There are following three kinds of elements as examples. These three kinds of elements are an element which performs four-wave mixing by a semiconductor optical amplifier or an optical fiber, an element which performs cross-gain modulation by a semiconductor optical amplifier, and an element which performs cross-phase modulation by semiconductor optical amplifiers.

As for four-wave mixing by the semiconductor optical amplifier, as shown in FIG. 1A, a signal light and a pump light are applied to a semiconductor optical amplifier 91 which is the optical nonlinear medium. Then, a wavelength-converted light (four-wave mixed light) is generated and is separated from the signal light and the pump light by an optical filter 92 and is output, in which the light frequency (2fp–fs) of the wavelength-converted light and the light frequency (fs) of the signal light are symmetric with respect to the light frequency (fp) of the pump light.

As for the cross-gain modulation by the semiconductor optical amplifier, as shown in FIG. 1B, when a signal light of wavelength $\lambda s$ is applied to a semiconductor optical amplifier 93 which is rendered under gain saturation condition by applying a pump light of wavelength $\lambda p$, gain for the pump light of wavelength $\lambda p$ decreases if the intensity of the signal light is high. Thus, the pump light of wavelength $\lambda p$ is output such that code represented by the pump light is logically inverted with respect to code represented by the signal light. Then, the pump light is separated from the signal light of wavelength $\lambda s$ by an optical filter 94 and is output as the wavelength-converted light.

As for cross-phase modulation by semiconductor optical amplifiers, as shown in FIG. 1C, a pump light of wavelength $\lambda p$ is divided into two lights by an optical coupler 95-1 which lights are applied to two semiconductor optical amplifiers 96-1 and 96-2. In addition, a signal light of wavelength $\lambda s$ is applied-to the semiconductor optical amplifier 96-1 via an optical coupler 95-2 from the opposite direction, in which output lights from the two semiconductor optical amplifiers 96-1 and 96-2 are combined by an optical coupler 95-3. When the signal light is applied to the semiconductor optical amplifier 96-1, the refractive index of the semiconductor optical amplifier 96-1 is changed so that the phase of the pump light which passes through the semiconductor optical amplifier 96-1 is changed. Thus, the phases of the pump lights output from the two semiconductor optical amplifiers 96-1 and 96-2 become different. As a result, when the lights are mixed by the optical coupler 95-3, phase variation appears as intensity variation. Therefore, the pump light of wavelength $\lambda p$ which has the same logic code as that of the signal light of $\lambda s$ is output from the output edge of the optical coupler 95-3 as the wavelength-converted light.

Semiconductor devices used in the above-mentioned structures have a limitation of response speed. Thus, it is technically difficult and costs very much to process high speed signal higher than 40 Gbit/s.

In order to solve these problems, a wavelength conversion technique by using optical parametric process in a second-order optical nonlinear medium is proposed. The response speed of the second-order optical nonlinear medium is high such that wavelength conversion of ultrahigh-speed optical signal faster than 100 Gbit/s is possible. The wavelength conversion by using optical parametric process can be performed by a third-order optical nonlinear medium. However, it is known that, generally, the nonlinear coefficient of the second-order optical nonlinear medium is larger than that of the third-order optical nonlinear medium so that the second-order optical nonlinear medium can generate the wavelength-converted light efficiently by using short-length crystal (reference: M. H. cho, et al., IEEE photonics technology letters, VOL.11, pp. 653, 1999).

As for the wavelength conversion by using optical parametric process, conversion efficiency becomes higher when a traveling-wave type device is used and it is desirable that the wavelength conversion is performed in a configuration configured such that an input signal light and a wavelength-converted light are output in the same direction. However, according to this configuration, there is a problem in that, when wavelength difference between the input signal light and the wavelength-converted light is small, it becomes practically impossible to separate the input signal light and the wavelength-converted light at the output side.

SUMMARY OF THE INVENTION

It is an object of the present invention to provide an optical parametric circuit which realizes traveling-wave type parametric wavelength conversion of high efficiency and which can separate the input signal light and the wavelength-converted light (or phase-conjugated light) even when the wavelength difference is small.

It is another object of the present invention to provide an optical parametric circuit which can generate a phase-conjugated light having no wavelength shift from the input signal light and which can completely separate the input signal light and the phase-conjugated light.

It is still another object of the present invention to provide-an optical parametric circuit which can output an amplified wavelength-converted light (or phase-conjugated light) from the input signal light.

The above objects of the present invention are achieved by an optical parametric circuit comprising:

a first optical path which connects an output port of a first optical coupler and an input port of a second optical coupler;

a second optical path which connects an output port of the first optical coupler and an input port of the second optical coupler;

an optical dispersive medium and a second-order optical nonlinear medium provided in each of the first optical path and the second optical path; and wherein the optical dispersive medium and the second-order optical nonlinear medium in the first optical path are placed in the reverse order of the optical dispersive medium and the second-order optical nonlinear medium which are placed in the second optical path.

The above objects of the present invention are also achieved by an optical parametric circuit comprising:

an optical coupler;

a nonlinear loop mirror; and wherein one output port of the optical coupler is connected to another output port of the optical coupler via an optical dispersive medium and a second-order optical nonlinear medium by the nonlinear loop mirror.

BRIEF DESCRIPTION OF THE DRAWINGS

Other objects, features and advantages of the present invention will become more apparent from the following detailed description when read in conjunction with the accompanying drawings, in which:

FIGS. 1A–1C show basic configurations of conventional wavelength conversion elements;

FIGS. 6A and 6B show a fourth embodiment of the optical parametric circuit of the present invention;

FIGS. 10A and 10B show configuration examples of the optical dispersive medium and the second-order optical nonlinear medium of the sixth embodiment.

FIGS. 11A and 11B are figures for explaining a problem in modification 1 of the sixth embodiment;

FIGS. 12A and 12B are figures for explaining a method for using a modulation pattern;

FIGS. 13A and 13B show an example in which phase matching condition can be satisfied in eight pump light wavelength ranges by applying three-fold modulation;

FIGS. 16A and 16B show an eighth embodiment of the optical parametric circuit of the present invention;

FIGS. 18A and 18B show a tenth embodiment of the optical parametric circuit of the present invention;

FIGS. 22A and 22B shows a configuration example 2 of the optical dispersive medium and the second-order optical nonlinear medium in the twelfth embodiment;

FIG. 23 shows a thirteenth embodiment of the optical parametric circuit of the present invention.

DETAILED DESCRIPTION OF THE PREFERRED EMBODIMENTS

In the following, the principle of the present invention will be described.

Figure 1A:
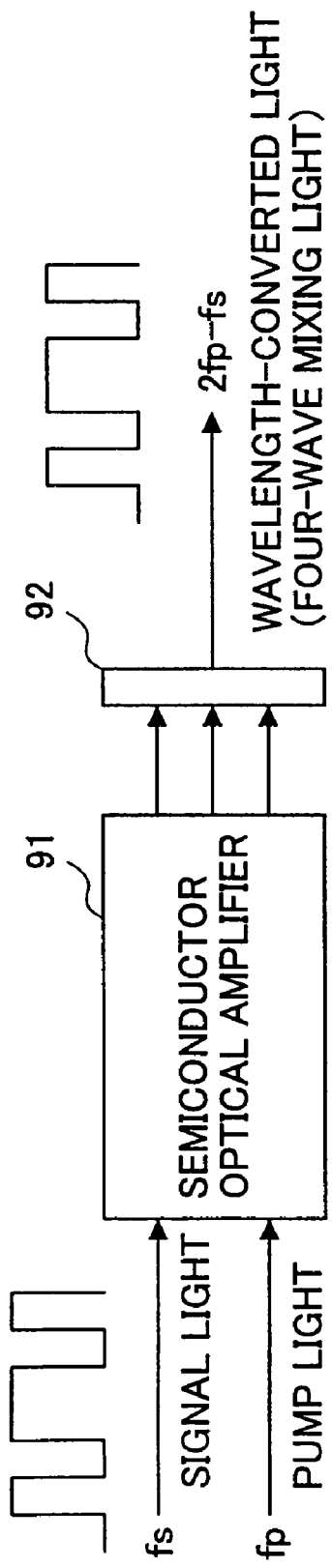
Figure 1C:
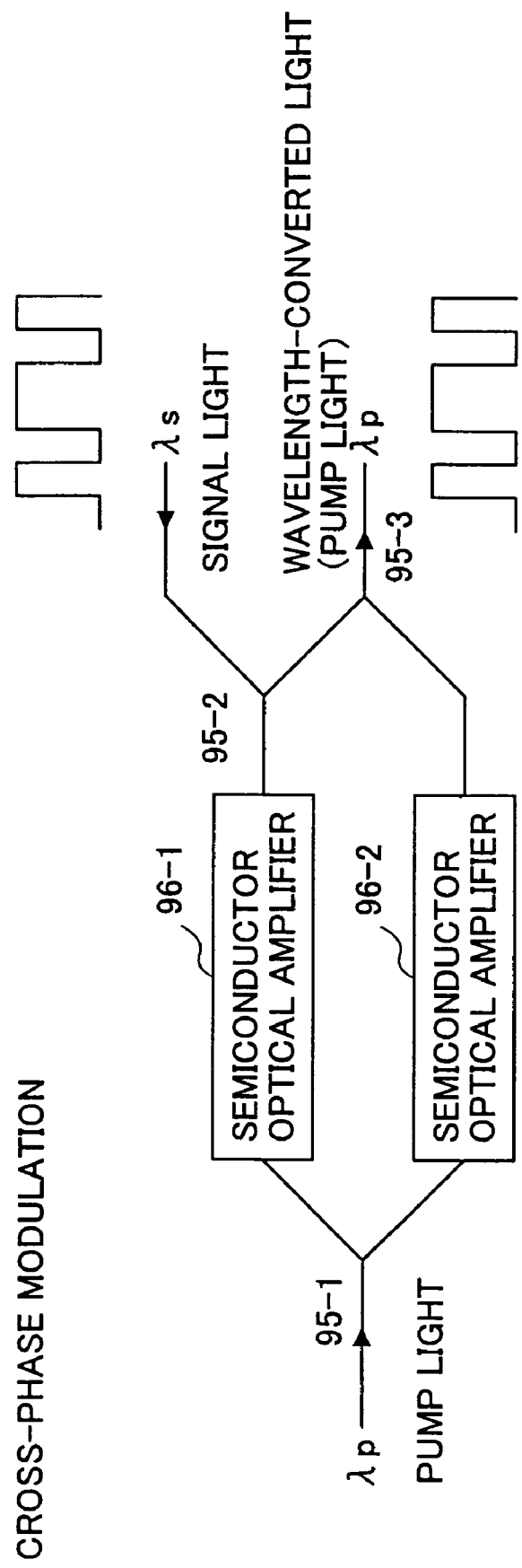
Figure 2:
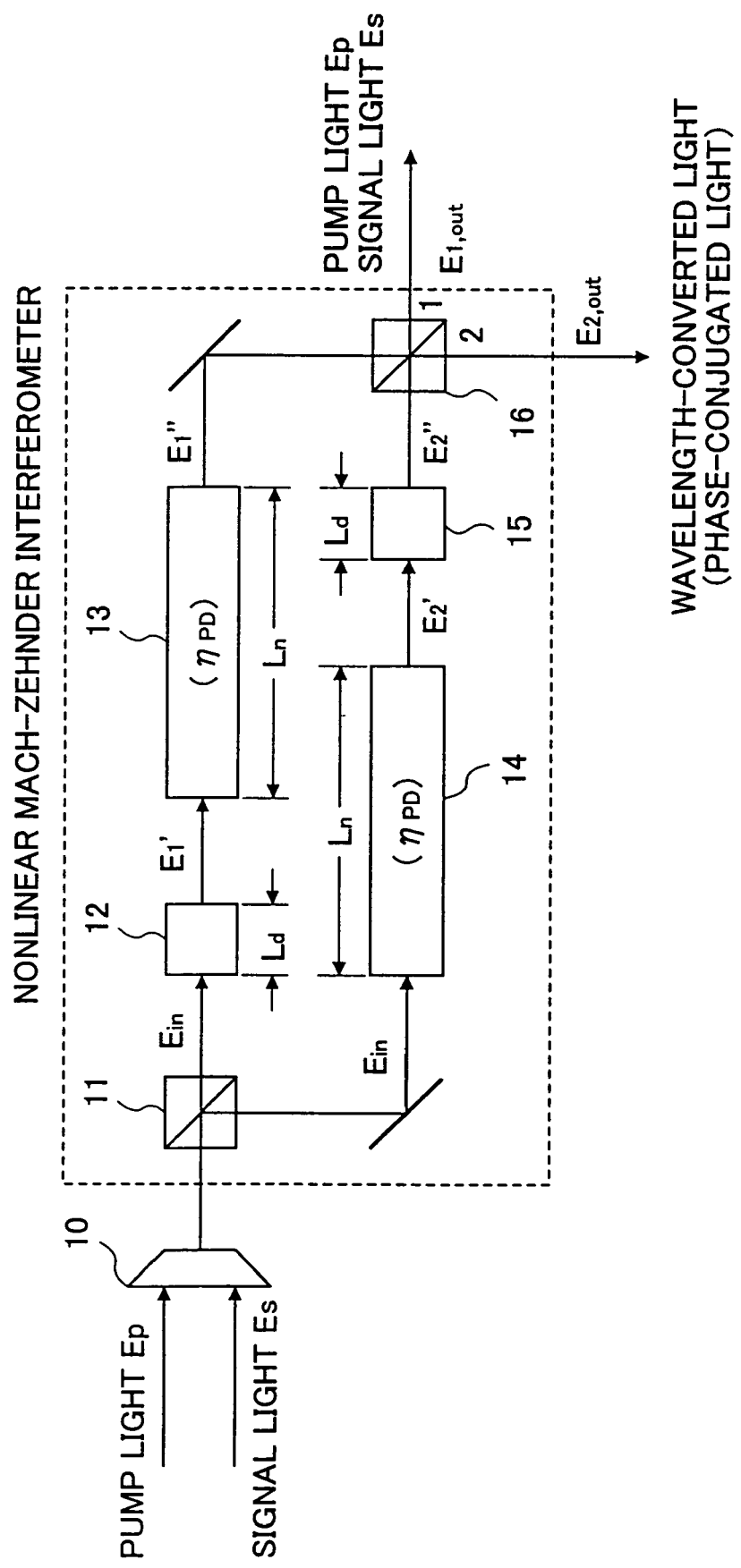
FIG. 2 shows a basic configuration of the optical parametric circuit of the present invention.

FIG. 2 shows a basic configuration of the optical parametric circuit of the present invention.

As shown in FIG. 2, the optical parametric circuit of the present invention is configured as a nonlinear Mach-Zehnder interferometer which includes two optical paths each of which optical paths includes an optical dispersive medium and a second-order optical nonlinear medium. In this configuration, the placement order of the optical dispersive medium and the second-order optical nonlinear medium in one optical path of the two is the opposite of that of the other optical path.

A signal light and a pump light are mixed by a WDM coupler 10. The mixed light is input from an input port which is one of two input ports of an optical coupler 11 which has two input ports and two output ports so that the mixed light is divided into two optical paths. The mixed light which is divided and travels in one optical path is applied to an optical dispersive medium 12 first, and, then, the mixed light is applied to a second-order optical nonlinear medium 13. The mixed light which is divided and which travels in the other optical path is applied to a second-order optical nonlinear medium 14, and, then, the mixed light is applied to an optical dispersive medium 15. Wavelength-converted lights generated by the second-order optical nonlinear mediums 13, 14, and the signal light and the pump light which pass through two optical paths are mixed by an optical coupler 16 which has two input ports and two output ports. As a result, the signal light and the pump light are output from one of two output ports, and the wavelength-converted light is output from the other output port. That is, the optical parametric circuit can divide and output the signal light and the wavelength-converted light even when the wavelength difference between the signal light and the wavelength-converted light is small or 0. The principle will be described in the following.

Assuming that electric fields of the signal light and the pump light are Es, Ep, and that the angular frequencies are $\omega_s$, $\omega_p$ respectively, output electric field of the mixed lights which are output to the two optical paths from the optical coupler can be represented by the following equation (1).

$$E_{in} = \frac{1}{\sqrt{2}} [|Es|\exp(i\omega_s t) + |Ep|\exp(i\omega_p t)] \quad (1)$$

When the mixed light which is output to the one optical path is applied to the optical dispersive medium 12, phase difference between the signal light and the pump light is changed. The output electric field can be represented by the following equation (2), $$E_1' = \frac{1}{\sqrt{2}} \big[ |Es|\exp(i\omega_S t - i\beta(\omega_S)L_d) + \qquad (2)$$
$$|Ep|\exp(i\omega_P t - i\beta(\omega_P)L_d) \big]$$

wherein $\beta(\omega_s)$ and $\beta(\omega_p)$ are propagation coefficients of the optical dispersive medium 12 when optical angular frequencies are $\omega_s$ and $\omega_p$, $L_d$ represents the length of the optical dispersive medium 12. When the mixed light is applied to the second-order optical nonlinear medium 13, the wavelength-converted light is generated. The output electric field of the wavelength-converted light is represented by the following equation (3).

$$E_1'' = \frac{1}{\sqrt{2}} \big[ |Es|\exp(i\omega_S t - i\beta(\omega_S)L_d) + \qquad (3)$$
$$|Ep|\exp(i\omega_P t - i\beta(\omega_P)L_d) +$$
$$\sqrt{\eta_{PD}}\, |Es|\exp(i\omega_P t - i\omega_S t - i(\beta(\omega_P) - \beta(\omega_S))L_d) \big]$$

$\eta_{PD}$ which means wavelength conversion efficiency ($\omega_p \to \omega_s$) can be represented as the following equation (4), $$\eta_{PD} = \frac{1}{4}\left[\frac{\omega_s(\omega_P - \omega_S)}{c^3 \varepsilon_0^3 n^3 A} d^2\right] L_n^2 \frac{P_P}{2} \qquad (4)$$
$$= \eta_{PD}' \times (L_n^2 P_P)$$

wherein $\omega_p$(rad/s) is the optical angular frequency of the pump light, $\omega_s$(rad/s) is the optical angular frequency of the signal light, $\varepsilon_0$(Fm$^{-2}$) is the electric permeability of vacuum, c(m/s) is the lightwave velocity, n is the refractive index of the optical nonlinear medium 13, $L_n$(m) is the effective length, A(m$^2$) is the effective cross-section area, d(m/V) is the nonlinear-dielectric constant, $P_p$(W) is the pump light power. $\eta_{PD}'$ is a conversion parameter. Each refractive index n of the second-order optical nonlinear medium 13 for each wavelength is assumed to be the same. In addition, for the sake of simplicity, it is assumed that energy of the signal light and the pump light is invariable. However, strictly speaking, the signal light is amplified and the pump light is attenuated in the optical parametric process.

On the one hand, the mixed light which is output to the other optical path from the optical coupler 11 is applied to the second-order optical nonlinear medium 14 first so that wavelength-converted light is generated. The output electric field of the wavelength-converted light is represented by the following equation (5).

$$E_2' = \frac{1}{\sqrt{2}} \big[ |Es|\exp(i\omega_S t) + |Ep|\exp(i\omega_P t) + \qquad (5)$$
$$\sqrt{\eta_{PD}}\, |Es|\exp(i\omega_P t - i\omega_S t) \big].$$

Since this light is applied to the optical dispersive medium 15, the output electric field is represented by the following equation (6), $$E_2'' = \frac{1}{\sqrt{2}} \big[ |Es|\exp(i\omega_S t - i\beta(\omega_S)L_d) + \qquad (6)$$
$$|Ep|\exp(i\omega_P t - i\beta(\omega_P)L_d) +$$
$$\sqrt{\eta_{PD}}\, |Es|\exp(i\omega_P t - i\omega_S t - i\beta(\omega_P - \omega_S)L_d) \big]$$

wherein material parameters of the optical dispersive medium 15 are the same as those of the optical dispersive medium 12.

Since the output light (represented by the equation (3)) from the second-order optical nonlinear medium 13 and the output light (represented by the equation (6)) from the optical dispersive medium 15 are mixed at the optical coupler 16, output electric fields of the output port 1 and the output port 2 are represented by following equations (7) and (8) respectively.

$$E_{1.OUT} = |Es|\exp(i\omega_S t - i\beta(\omega_S)L_d) + \qquad (7)$$
$$|Ep|\exp(i\omega_P t - i\beta(\omega_P)L_d) +$$
$$\sqrt{\frac{\eta_{PD}}{2}}\, |Es|[\exp(i\omega_P t - i\omega_S t - i(\beta(\omega_P) - \beta(\omega_S))L_d) +$$
$$\exp(i\omega_P t - i\omega_S t - i\beta(\omega_P - \omega_S)L_d]$$

$$E_{2.OUT} = \sqrt{\frac{\eta_{PD}}{2}}\, |Es|[\exp(i\omega_P t - i\omega_S t - i(\beta(\omega_P) - \beta(\omega_S))L_d) - \qquad (8)$$
$$\exp(i\omega_P t - i\omega_S t - i\beta(\omega_P - \omega_S)L_d)]$$

That is, the signal light and the pump light are output from the output port 1. The wavelength-converted light is output from both of the output port 1 and the output port 2. The power of the wavelength-converted light output from each of the output ports is represented by following equations (9) and (10).

$$P_1 = \eta_{PD}|E|^2[1+\cos\{(\beta(\omega_p)-\beta(\omega_s)-\beta(\omega_p-\omega_s))L_d\}] \qquad (9)$$

$$P_2 = \eta_{PD}|Es|^2[1-\cos\{(\beta(\omega_p)-\beta(\omega_s)-\beta(\omega_p-\omega_s))L_d\}] \qquad (10)$$

As is understood from these equations, the output power of the wavelength-converted light varies according to phase shift provided by the optical dispersive mediums 12 and 15. For example, in the optical dispersive mediums 12 and 15, when a condition indicated by the following equation (11) is satisfied $$\Delta\beta L_d = (\beta(\omega_p)-\beta(\omega_s)-\beta(\omega_{p-\omega s}))L_d = (2n-1)\pi \qquad (11)$$

wherein n is an integer, 100% of the wavelength converted light is output from the output port 2 which is different from the output port 1 from which the signal light and the pump light are output. Thus, the wavelength-converted light can be completely separated from the input signal light.

This is also true even when the wavelength of the wavelength-converted light is the same as that of the input signal light, wherein the wavelength-converted light of this case becomes a phase-conjugated light of the input signal light which has the same wavelength as that of the input signal light.

When $\eta_{PD} \gg 1$ in the equations (3) and (6), the wavelength-converted light (phase-conjugated light) is amplified with respect to the input signal light. Thus, the optical parametric circuit functions as an optical parametric amplifier.

Although the above description is based on the configuration in which the signal light and the pump light are mixed and applied to one input port of the optical coupler 11 of the nonlinear Mach-Zehnder interferometer, the optical parametric circuit can be also configured such that each of the signal light and the pump light is applied to each of the two input ports. Also in this case, the equation (11) represents the condition for realizing complete separation between the wavelength-converted light (phase-conjugated light) and the input signal light. In this case, the pump light is output from the output port from which the wavelength-converted light (phase-conjugated light) is output.

In the following, embodiments of the present invention will be described.

First Embodiment

Figure 3:
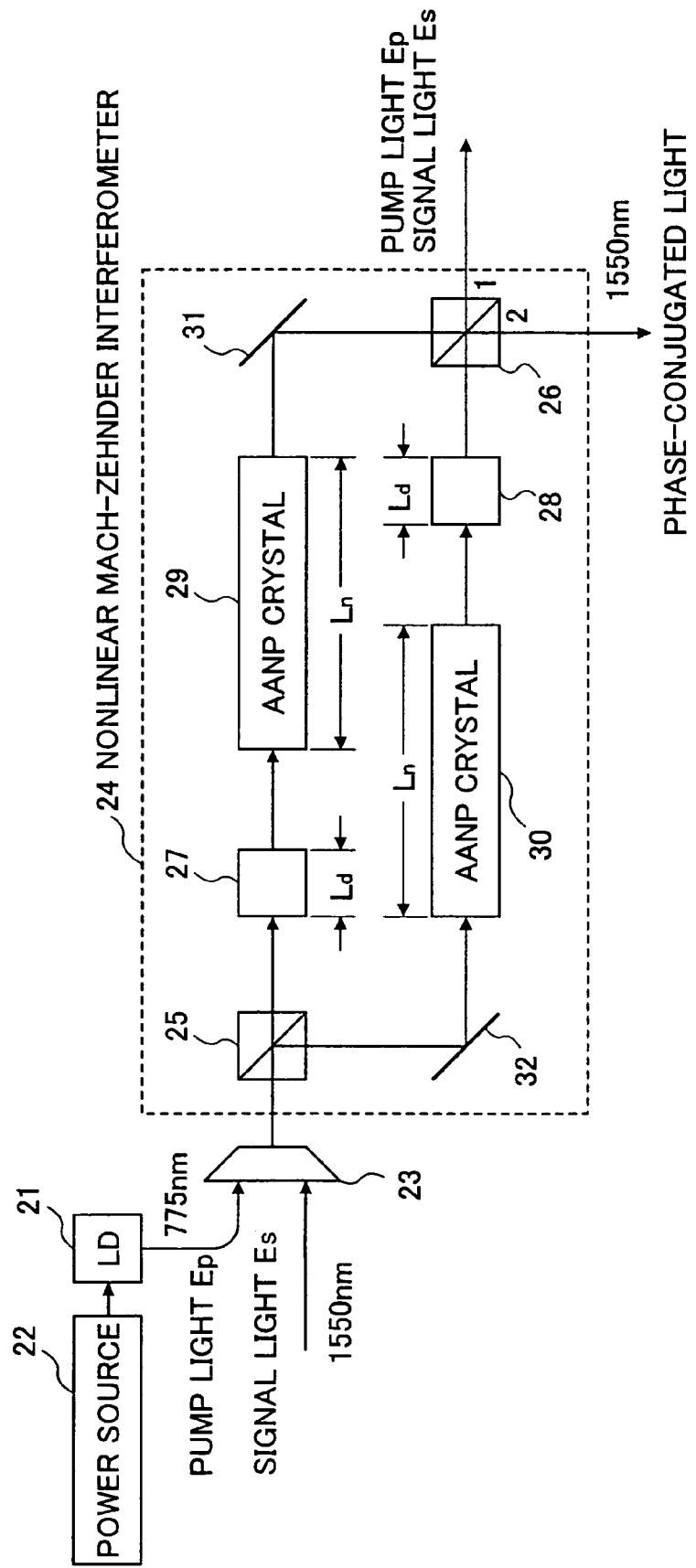
FIG. 3 shows a first embodiment of the optical parametric circuit of the present invention.

FIG. 3 shows a first embodiment of the optical parametric circuit of the present invention. In this embodiment, a configuration of the optical parametric circuit will be described in which the wavelength of the signal light is 1550 nm which is suitable for optical transmission, the wavelength of the pump light is 775 nm which corresponds-to second-order harmonic wave of the signal light, and phase-conjugated light which has the same wavelength 1550 nm as that of the input signal light is output.

In the figure, a semiconductor laser light source (Laser Diode:LD) 21 is driven by a power source 22 and oscillates at the wavelength 775 nm. The signal light and the pump light output from the semiconductor laser light source 21 are mixed by a WDM coupler 23 and applied to the nonlinear Mach-Zehnder interferometer 24. The nonlinear Mach-Zehnder interferometer 24 includes two optical paths between optical couplers 25 and 26 in which zinc-selenide 27 or 28 as the optical dispersive medium and AANP crystal 29 or 30 are inserted in each of the optical paths. The zinc-selenide 27 and the AANP crystal 29 form one optical path and the AANP crystal 30 and the zinc-selenide 28 form the other optical path.

As for this configuration example, components are coupled via space wherein reflecting mirrors 31, 32 are provided in the two optical paths. In order that the effective optical path-lengths of the two optical paths become identical, the lengths of the space part of the two optical paths are set to be identical. In addition, the lengths of the AANP crystals 29 and 30 in the direction of light propagation are set to be identical and the lengths of the zinc-selenides 27 and 28 in the direction of light propagation are set to be identical.

Assuming that the length of the AANP crystals 29, 30 used as the optical nonlinear medium is $L_n$=0.5 cm, the effective cross-section area is A=500 $\mu m^2$, and the second-order nonlinear-dielectric constant is d=$10^{-22}$ (MKS), the conversion parameter $\eta_{PD}'$ becomes $$\eta_{PD}' = 3.6 \times 10^{-5} \text{ (mW}^{-1}\text{cm}^{-2}) \tag{12}$$

Assuming that the pump light power is $P_p$=1000 mW, wavelength conversion efficiency $\eta_{PD}$ becomes about 4.5× $10^{-3}$(−23.5 dB).

The length $L_d$ of the zinc-selenides 27, 28 can be calculated as follows, wherein the length $L_d$ is a key for separating the signal light and the generated phase-conjugated light completely at the output stage of the optical parametric circuit. The refractive index of the zinc-selenide is n($\lambda_p$) =2.56 for pump light wavelength $\lambda_p$=775 nm and n($\lambda_s$)=2.47 for signal light wavelength $\lambda_s$=1550 nm. These values are substituted into the left-hand side of the equation (11) for obtaining the length $L_d$ of the zinc-selenide such that the left-hand side becomes equal to the right-hand side, wherein $\lambda_p$=2πc/$\omega_p$ and $\lambda_s$=2πc/$\omega_s$. According to the equation (11), $$\begin{aligned}\Delta\beta L_d &= (\beta(\omega_P) - \beta(\omega_S) - \beta(\omega_P - \omega_S))L_d \\ &= 2\pi(n(\lambda_P)/\lambda_P - 2n(\lambda_S)/\lambda_S)L_d \\ &= 2\pi(2.56/(775 \times 10^{-9}) - 2 \times 2.47/(1550 \times 10^{-9}))L_d \\ &= (2n-1)\pi\end{aligned} \tag{13}$$

(n is an integer), thus, $L_d$=4.3 $\mu$m (n=1) is the condition for separating the signal light and the phase-conjugated light completely. Therefore, by configuring the optical parametric circuit by using a zinc-selenide film of 4.3 $\mu$m long as the optical dispersive medium, it becomes possible that the phase-conjugated light having the same wavelength as that of the signal light can be separated from the signal light and output from the output port 2.

In addition, in the above-mentioned configuration, when the signal light and the pump light are applied to the two input ports of the optical coupler 25 respectively, the signal light is output from the output port 1, and the phase-conjugated light and the pump light are output from the output port 2. In this case, since the wavelength difference between the phase-conjugated light and the pump light is large, these can be easily separated.

As the optical parametric crystal forming the optical nonlinear medium, MMA polymer and DAN crystal which are the same organic material as the AANP crystal, LiNbO$_3$, LiTaO$_3$, KTP(KLiOPO$_4$). KDP(KH$_2$PO$_4$), KNbO$_3$ and the like which are nonorganic crystal materials, GaN, ZnSSe, GaAs/GaAlAs semiconductor, AgGaSe$_2$, and AgGaS can be use in addition to the above-mentioned AANP crystal. Further, as the optical dispersive medium, materials such as fused-silica, synthesized sapphire, artificial quartz, and ceramic glass which has small thermal expansion constant and the like can be used in addition to the zinc-selenide.

Second Embodiment

Figure 4A:
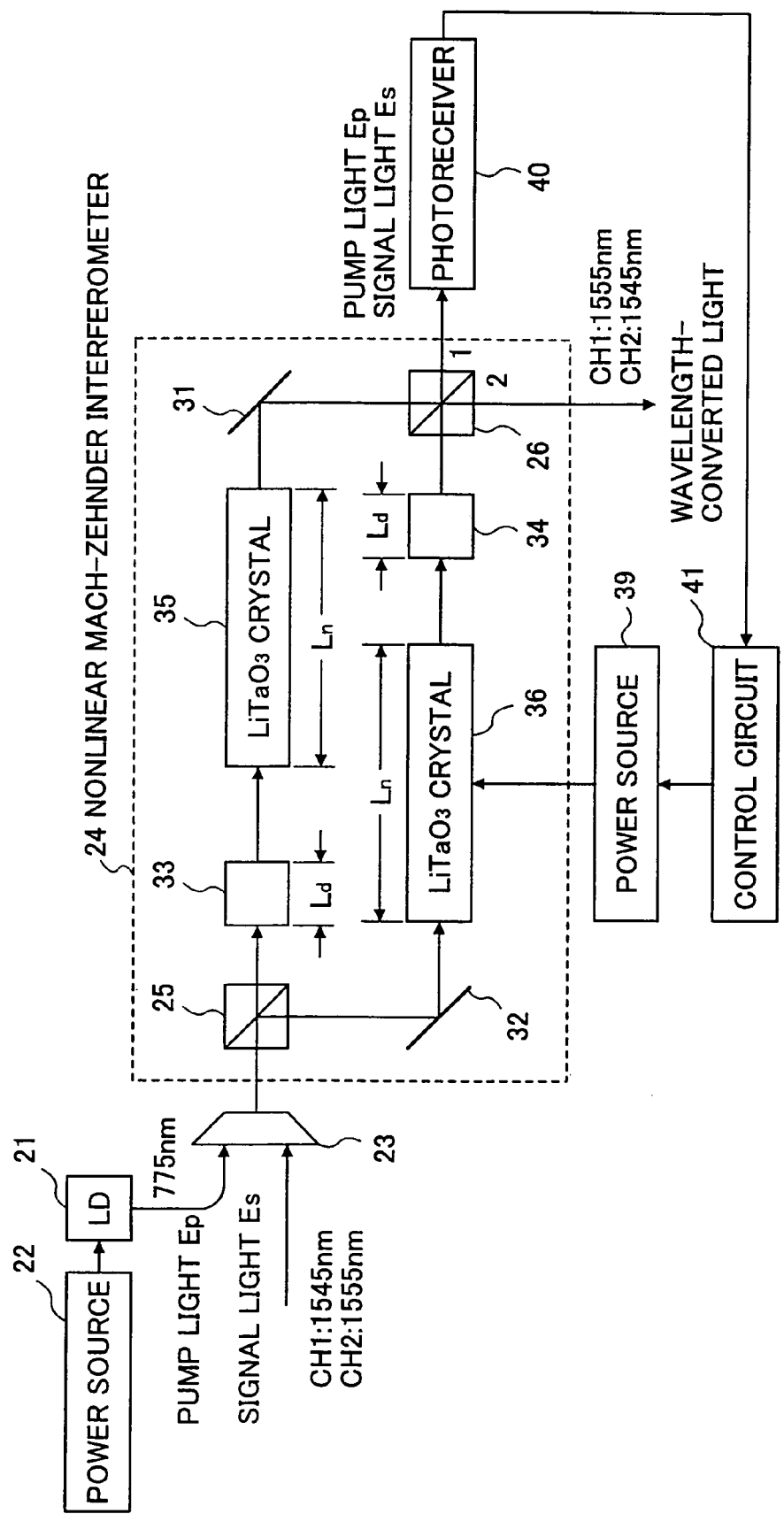
FIGS. 4A and 4B show a second embodiment of the optical parametric circuit of the present invention.

FIG. 4A shows the second embodiment of the optical parametric circuit of the present invention. In this embodiment, a configuration example which realizes "wavelength channel exchange" for exchanging the signal light wavelengths of a channel 1 and a channel 2, wherein the signal light includes two channels of wavelengths 1545 nm and 1555 nm and the wavelength of the pump light is 775 nm which corresponds to second-order harmonic wave of the signal light.

The basic configuration of this embodiment using the nonlinear Mach-Zehnder interferometer is almost the same as that of the first embodiment except that synthesized sapphires 33, 34 are used as the optical dispersive medium and LiTaO$_3$ crystals 35, 36 are used as the second-order optical nonlinear medium in this second embodiment.

Figure 4B:
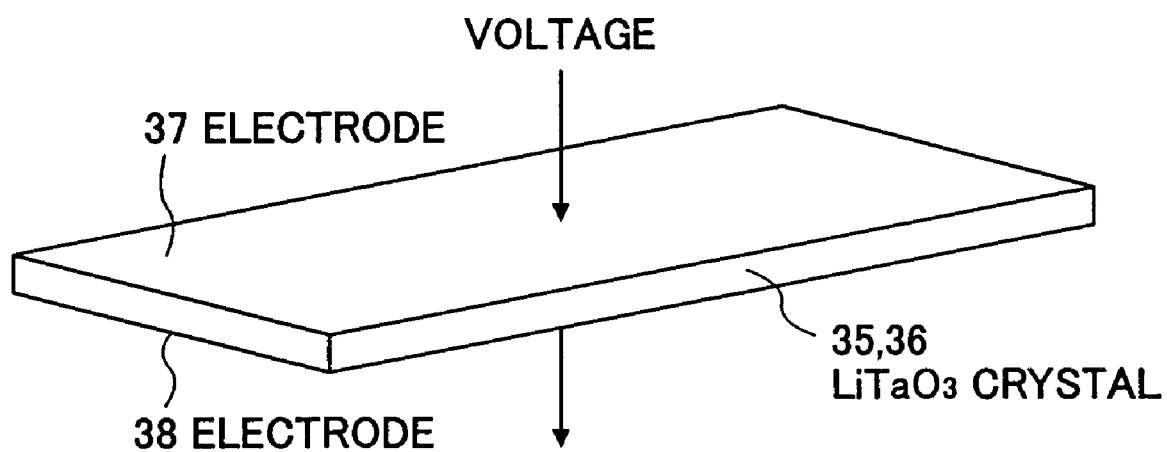

In addition, as shown in FIG. 4B, electrodes 37, 38 are evaporated onto the both surfaces of the LiTaO$_3$ crystal 36 which is inserted into a second optical path of the nonlinear Mach-Zehnder interferometer 24 in order that the optical path-length can be adjusted by applying voltage from a power source 39. The reason for adjusting the optical path-length is that there may be cases where output ports for the signal light and pump light, and the wavelength-converted light (phase-conjugated light) are swapped due to difference between optical path-lengths of the two optical paths of the nonlinear Mach-Zehnder interferometer 24.

In this embodiment, a photo receiver 40 is connected to the output port 1 from which the signal light and the pump light should be output. The pump light is selectively monitored via a band-pass filter in the photoreceiver 40 and a control circuit 41 receives detected output of the photoreceiver 40 according to the amount of received pump light. The control circuit 41 controls the power source 39 such that the amount of received pump light becomes maximum. Accordingly, the wavelength-converted light can be output from the output port 2. In this way, by providing such a feedback system for adjusting the optical path length, a robust system can be realized against manufacturing error of the nonlinear Mach-Zehnder interferometer 24.

Assuming that the length of the $LiTaO_3$ crystals 35, 36 used as the optical nonlinear medium is $L_n = 0.5$ cm, the effective cross-section area is $A = 500$ $\mu m^2$, and the second-order nonlinear-dielectric constant is $d = 2.5 \times 10^{-22}$ (MKS), the conversion parameter $\eta_{PD}'$ becomes $$\eta_{PD}' = 4.7 \times 10^{-5} (mW^{-1} cm^{-2}) \quad (14).$$

Assuming that the pump light power is $P_p = 1000$ mW, wavelength conversion efficiency $\eta_{PD}$ becomes about $5.125 \times 10^{-3}$ ($-22.9$ dB).

The length $L_d$ of the synthesized sapphires 33, 34 can be calculated as follows, wherein the length $L_d$ is a key for separating the signal light and the generated wavelength-converted light completely at the output stage of the optical parametric circuit. The refractive index of the synthesized sapphire is $n(\lambda_p) = 1.762$ for pump light wavelength $\lambda_p = 775$ nm and $n(\lambda_s) = 1.746$ for signal light wavelength $\lambda_s = 1550$ nm. These values are substituted into the left-hand side of the equation (11) for obtaining the length $L_d$ of the synthesized sapphire such that the left-hand side becomes equal to the right-hand side. According to the equation (11), $$\Delta \beta L_d = (\beta(\omega_P) - \beta(\omega_S) - \beta(\omega_P - \omega_S))L_d \quad (15)$$
$$= 2\pi(n(\lambda_P)/\lambda_P - 2n(\lambda_S)/\lambda_S)L_d$$
$$= 2\pi(1.762/(775 \times 10^{-9}) -$$
$$2 \times 1.746/(1550 \times 10^{-9}))L_d$$
$$= (2n - 1)\pi$$

($n$ is an integer), thus, $L_d = 24.2$ $\mu m$ (n=1) is the condition for separating the signal light and the wavelength-converted light completely. Therefore, by configuring the optical parametric circuit by using synthesized sapphires of 24.2 $\mu m$ long as the optical dispersive medium, it becomes possible that wavelength-converted lights, in which wavelengths of the signal light of the channel 1 of 1545 nm and the channel 2 of 1555 nm are exchanged, are separated from the input signal light completely and output from the output port 2.

In addition, in the above-mentioned configuration, when the signal light and the pump light are applied to the two input ports of the optical coupler 25 respectively, the signal light is output from the output port 1, and the wavelength-converted light and the pump light are output from the output port 2. Therefore, in this case, the photoreceiver 40 which monitors the pump light is connected to the output port 2 via an optical coupler. Also in this case, since the wavelength difference between the wavelength-converted light and the pump light is large, these can be easily separated. The same goes for embodiments which will be described below.

As the optical parametric crystal forming the optical nonlinear medium, $LiNbO_3$, $KTP(KLiOPO_4)$, KDP ($KH_2PO_4$), $KNbO_3$ and the like which are nonorganic crystal materials same as the $LiTaO_3$ crystal, and AANP crystal, MMA polymer and DAN crystal which are organic materials, GaN, ZnSSe, GaAs/GaAlAs semiconductor, $AgGaSe_2$, and AgGaS can be used in addition to the above-mentioned $LiTaO_3$ crystal. Further, as the optical dispersive medium, in addition to the synthesized sapphire, materials such as zinc-selenide, fused-silica, artificial quartz, and ceramic glass which has small thermal expansion constant and the like can be used.

Third Embodiment

Figure 5:
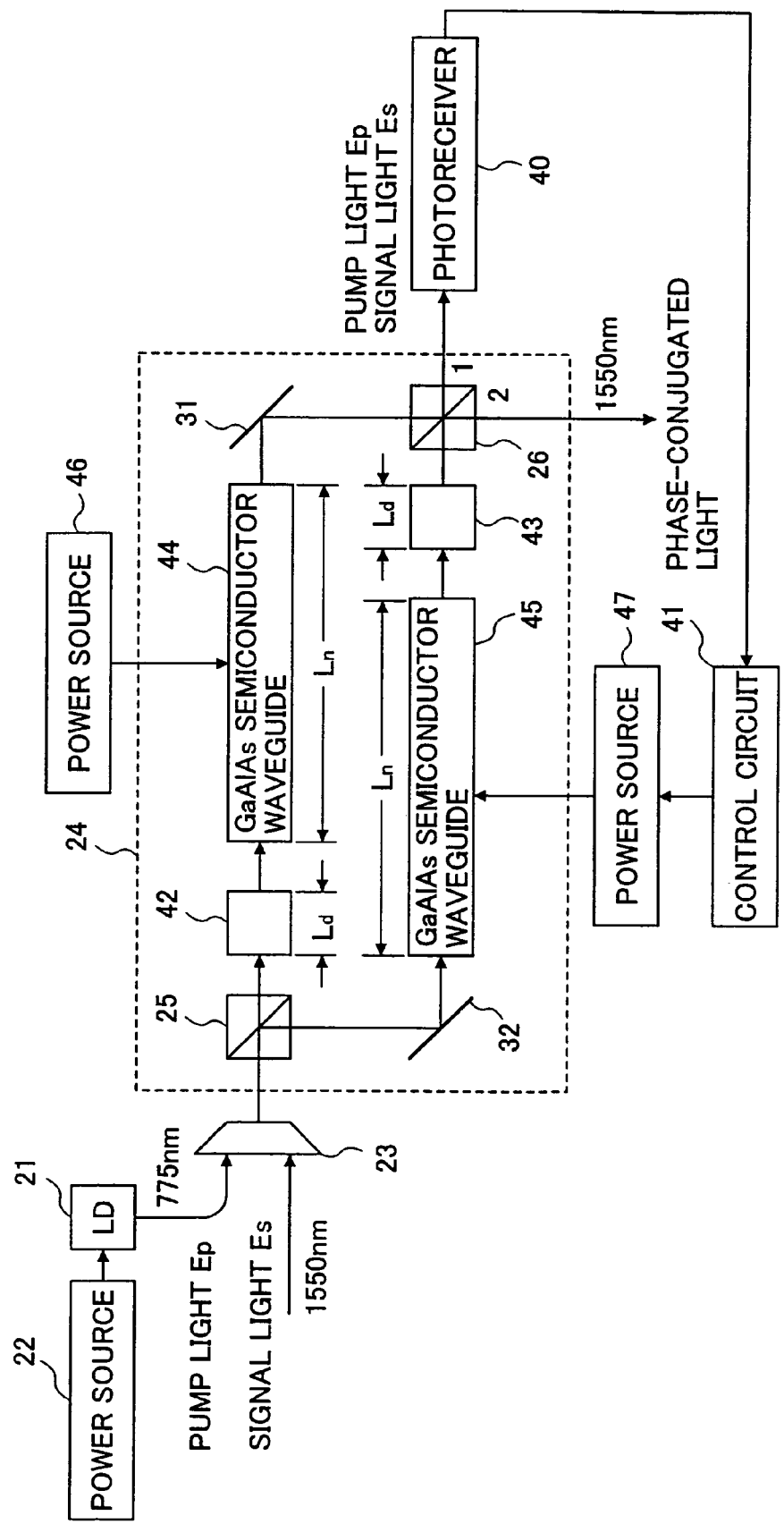
FIG. 5 shows a third embodiment of the optical parametric circuit of the present invention.

FIG. 5 shows the third embodiment of the optical parametric circuit of the present invention. In this embodiment, a configuration of the optical parametric circuit will be described in which the wavelength of the signal light is 1550 nm which is suitable for optical transmission, the wavelength of the pump light is 775 nm which corresponds to second-order harmonic wave of the signal light, and phase-conjugated light which has the same wavelength 1550 nm as that of the input signal light is output.

The basic configuration of this embodiment using the nonlinear Mach-Zehnder interferometer is almost the same as that of the first embodiment except that fused-silicas 42, 43 are used as the optical dispersive medium and GaAlAs semiconductor waveguides 44, 45 are used as the second-order optical nonlinear medium in this second embodiment. Power sources 46, 47 are connected to the GaAlAs semiconductor waveguides 44, 45 respectively wherein current of 50 mA is applied to each GaAlAs semiconductor waveguide.

In addition, like the second embodiment, the optical parametric circuit of the third embodiment includes the photoreceiver 40 monitoring the pump light power and the control circuit 41 such that the power source 47 obtains feedback from the control circuit 41 for compensating for the optical path-length error of the nonlinear Mach-Zehnder interferometer 24. Accordingly, the phase-conjugated light can be output from the output port 2 and a robust system can be realized against manufacturing error of the nonlinear Mach-Zehnder interferometer 24.

The GaAlAs semiconductor waveguides 44, 45 which are used as the second-order optical nonlinear medium have waveguide structure. By using the waveguide structure, the effect of light confinement of the pump light is heightened so that the effective cross-section area is reduced, and conversion efficiency increases while same pump light power is used.

Assuming that the length of the GaAlAs semiconductor waveguide is $L_n = 0.2$ cm, the effective cross-section area is $A = 50$ $\mu m^2$, and the second-order nonlinear-dielectric constant is $d = 1.3 \times 10^{-21}$ (MKS), the conversion parameter $\eta_{PD}'$ becomes $$\eta_{PD}' = 6.26 \times 10^{-2} (mW^{-1} cm^{-2}) \quad (16)$$

according to the equation (4).

Thus, when the pump light power is $P_p = 100$ mW, wavelength conversion efficiency $\eta_{PD}$ becomes about 1.25×

$10^{-1}$(−9.03 dB). Therefore, according to this embodiment, considerably higher conversion efficiency can be obtained while the pump light power which-is smaller by an order of magnitude than that used in the second embodiment is used.

The length $L_d$ of the fused-silicas 42, 43 can be calculated as follows, wherein the length $L_d$ is a key for separating the signal light and the generated phase-conjugated light completely at the output stage of the optical parametric circuit. The refractive index of the fused-silica is $n(\lambda_p)=1.454$ for pump light wavelength $\lambda_p=775$ nm and $n(\lambda_s)=1.444$ for signal light wavelength $\lambda_s=1550$ nm. Therefore, according to the equation (11), $$\Delta\beta L_d = (\beta(\omega_P) - \beta(\omega_S) - \beta(\omega_P - \omega_S))L_d \quad (17)$$

$$= 2\pi(n(\lambda_P)/\lambda_P - 2n(\lambda_S)/\lambda_S)L_d$$

$$= 2\pi(1.454/(775 \times 10^{-9}) -$$

$$2 \times 1.444/(1550 \times 10^{-9}))L_d$$

$$= (2n-1)\pi$$

($n$ is an integer), thus, $L_d$=38.8 μm (n=1) is the condition for separating the signal light and the phase-conjugated light completely. Therefore, by configuring the optical parametric circuit by using the fused-silica of 38.8 μm long as the optical dispersive medium, it becomes possible that the phase-conjugated light having the same wavelength as that of the signal light can be separated from the signal light and output from the output port 2.

As the optical waveguide used in this embodiment, in addition to the above-mentioned GaAlAs semiconductor, materials of GaN family semiconductor, ZnSSe family semiconductor, $LiNbO_3$, $LiTaO_3$, KTP($KLiOPO_4$), KDP ($KH_2PO_4$), $KNbO_3$ and the like can be used. In addition, as the optical dispersive medium, in addition to the above-mentioned fused-silica (38.8 μm long), zinc-selenide (first embodiment: 4.3 μm long), synthesized sapphire (second embodiment: 24.2 μm long), artificial quartz, and ceramic glass which has small thermal expansion constant can be used.

Fourth Embodiment

Figure 6A:
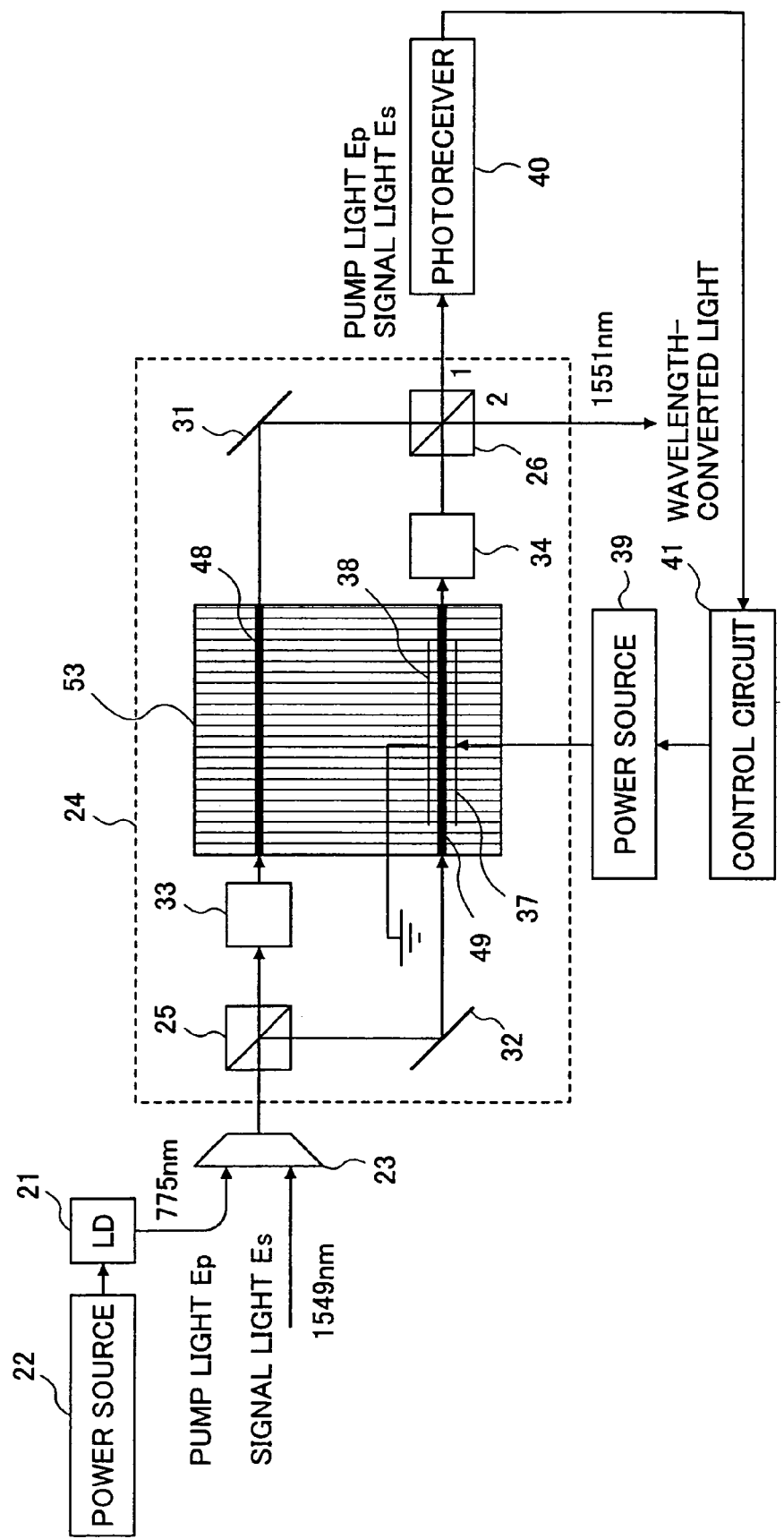

FIG. 6 shows the fourth embodiment of the optical parametric circuit of the present invention. In this embodiment, a configuration of the optical parametric circuit will be described in which the wavelength of the signal light is 1549 nm, the wavelength of the pump light is 775 nm which corresponds to second-order harmonic wave of the signal light, and wavelength-converted light of 1551 nm is output.

The basic configuration of this embodiment using the nonlinear Mach-Zehnder interferometer is almost the same as that of the first embodiment except that synthesized sapphires 33, 34 are used as the optical dispersive medium and quasi-phase matched $LiNbO_3$ waveguides 48, 49 are used as the second-order optical nonlinear medium in this fourth embodiment. As shown in FIG. 6B, the quasi-phase matched $LiNbO_3$ waveguides 48, 49 are two $LiNbO_3$ waveguides which are formed such that dipole-inversion regions 50 are formed on a $LiNbO_3$ substrate 53 at established intervals by applying voltage at the time of manufacturing and the two $LiNbO_3$ waveguides are formed by diffusing titanium (Ti) on the substrate. By adopting this waveguide structure, the effect of light confinement of the pump light is heightened so that the effective cross-section area is reduced, and phase match between the pump light and the signal light is realized.

Figure 7:
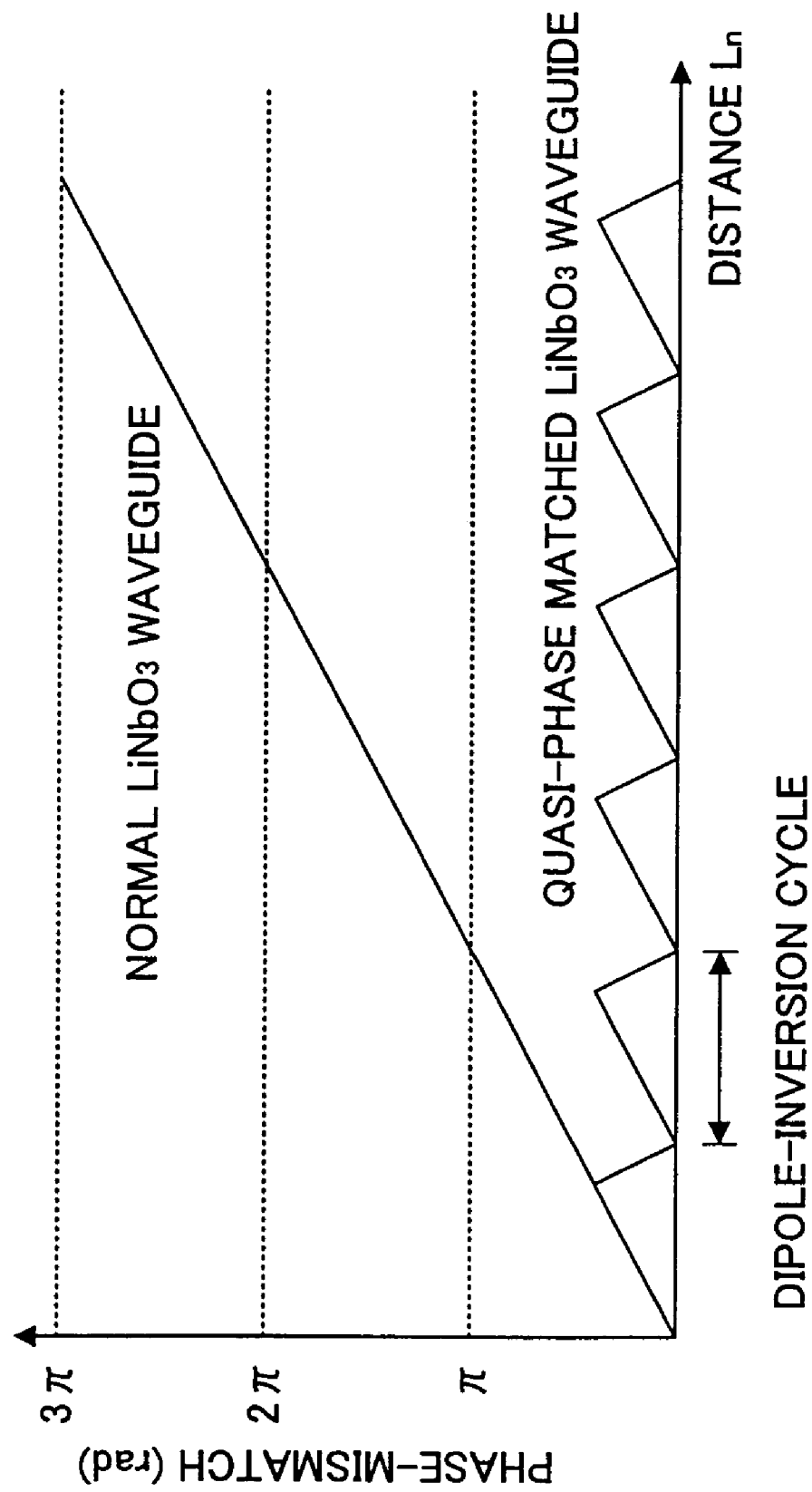
FIG. 7 is a figure for explaining effect of quasi-phase matched $LiNbO_3$ waveguide.

In the third embodiment, GaAlAs semiconductor waveguides 44, 45 are used as the optical nonlinear medium. Since difference between refractive indexes of the pump light and the signal light is very large, phase-mismatch is accumulated as shown in FIG. 7. Therefore, it is difficult to realize phase matching. This problem also occurs when-using waveguide of nonorganic crystal such as $LiNbO_3$ or waveguide of organic crystal such as AANP. Thus, this problem is a general problem. The periodic dipole-inversion structure is generally used for solving this problem. The accumulation of phase-mismatch between the pump light and the signal light is suppressed by inverting dipole direction of $LiNbO_3$ at established cycle. Thus, it becomes possible to lengthen the waveguide while satisfying the phase matching condition. As a result, conversion efficiency can be increased while the pump light power is the same.

In addition, like the second embodiment, for compensating for the optical path-length error of the nonlinear Mach-Zehnder interferometer 24, the optical parametric circuit of the fourth embodiment includes electrodes 37, 38 and the power source 39 which apply voltage to the second-order optical nonlinear medium, the photoreceiver 40 which monitors the pump light power and the control circuit 41 such that the power source 39 obtains feedback from the control circuit 41. Accordingly, the wavelength-converted light can be output from the output port 2 and a robust system can be realized against manufacturing error of the nonlinear Mach-Zehnder interferometer 24.

Assuming that the length of the quasi-phase matched $LiNbO_3$ waveguides 48, 49 used as the optical nonlinear medium is $L_n$=6 cm, the effective cross-section area is A=50 μm$^2$, and the second-order nonlinear-dielectric constant is d=5×10$^{-23}$ (MKS), the conversion parameter $\eta_{PD}'$ becomes $$\eta_{PD}'=9.2\times10^{-5}(mW^{-1}cm^{-2}) \quad (18)$$

according to the equation (4).

Thus, when the pump light power is $P_p$=1000 mW, the wavelength conversion efficiency n PD becomes about 1.66 (2.2 dB). Thus, in this case, not only wavelength conversion but also amplification of wavelength-converted light is possible.

The length $L_d$ of the synthesized sapphires 33, 34, which is a key for separating the signal light and the generated wavelength-converted light completely at the output stage of the optical parametric circuit, is the same as that in the second embodiment. That is, by configuring the optical parametric circuit by using the synthesized sapphire of 24.2 μm long as the optical dispersive medium, it becomes possible that the wavelength-converted-light can be separated from the signal light and output from the output port 2.

As the quasi-phase matched waveguide forming the optical nonlinear medium, materials such as $LiTaO_3$, KTP ($KLiOPO_4$), KDP($KH_2PO_4$) and $KNbO_3$, and, GaAlAs family semiconductor, GaN family semiconductor and ZnSSe family semiconductor can be used in addition to the above-mentioned $LiNbO_3$. Further, in addition to the above-mentioned synthesized sapphire, zinc-selenide, fused-silica, artificial quartz, and ceramic glass which has small thermal expansion constant can be used as the optical dispersive medium.

Fifth Embodiment

Figure 8:
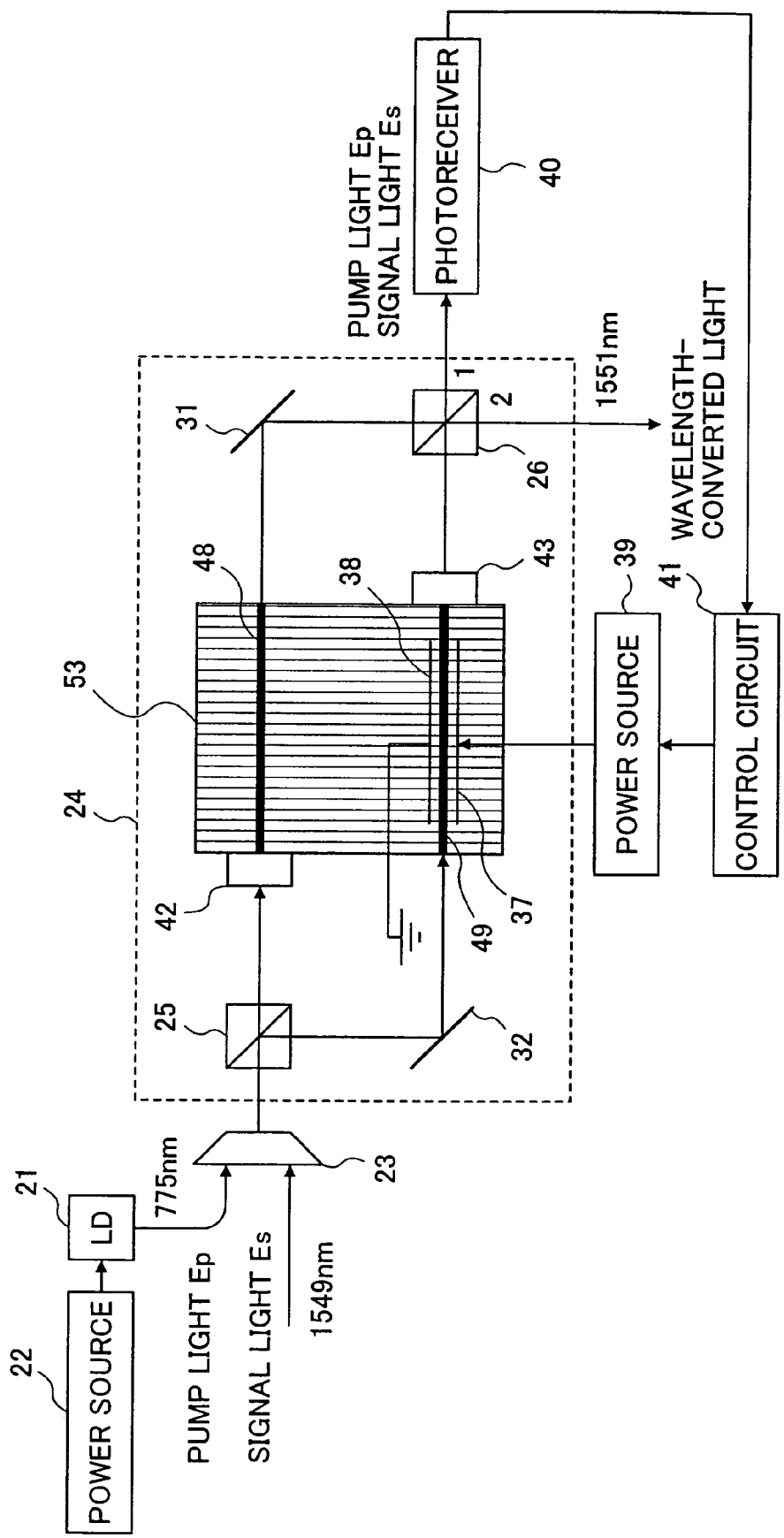
FIG. 8 shows a fifth embodiment of the optical parametric circuit of the present invention.

FIG. 8 shows the fifth embodiment of the optical parametric circuit of the present invention. In this embodiment, a configuration of the optical parametric circuit will be described in which the wavelength of the signal light is 1550 nm, the wavelength of the pump light is 775 nm which corresponds to second-order harmonic wave of the signal light, and, phase-conjugated light of 1550 nm which is the same as that of the input signal light is output.

The basic configuration of this embodiment is almost the same as that of the fourth embodiment. The difference is that, in this embodiment, fused-silicas 42, 43 are used as the optical dispersive medium, and, the fused-silicas 42, 43 and quasi-phase matched LiNbO₃ waveguides 48, 49 used as the second-order optical nonlinear medium are formed monolithically by evaporate the fused-silica onto input edge surface or output edge surface of the quasi-phase matched LiNbO₃waveguides 48, 49. The evaporation thickness of the fused-silicas 42, 43 is 38.8 µm which is the same as the length of the fused-silica used in the third embodiment as the optical dispersive medium. Accordingly, it becomes possible to reduce cost by reducing number of optical circuit parts while the optical parametric circuit of this embodiment has the same performance as the fourth embodiment, and the optical parametric circuit of this embodiment becomes suitable for mass production.

As the optical dispersive medium used in this embodiment, synthesized sapphire film, silica film, dielectric film in which dielectric mediums such as several glass materials of different refractive indexes are laminated.

Sixth Embodiment

Figure 9:
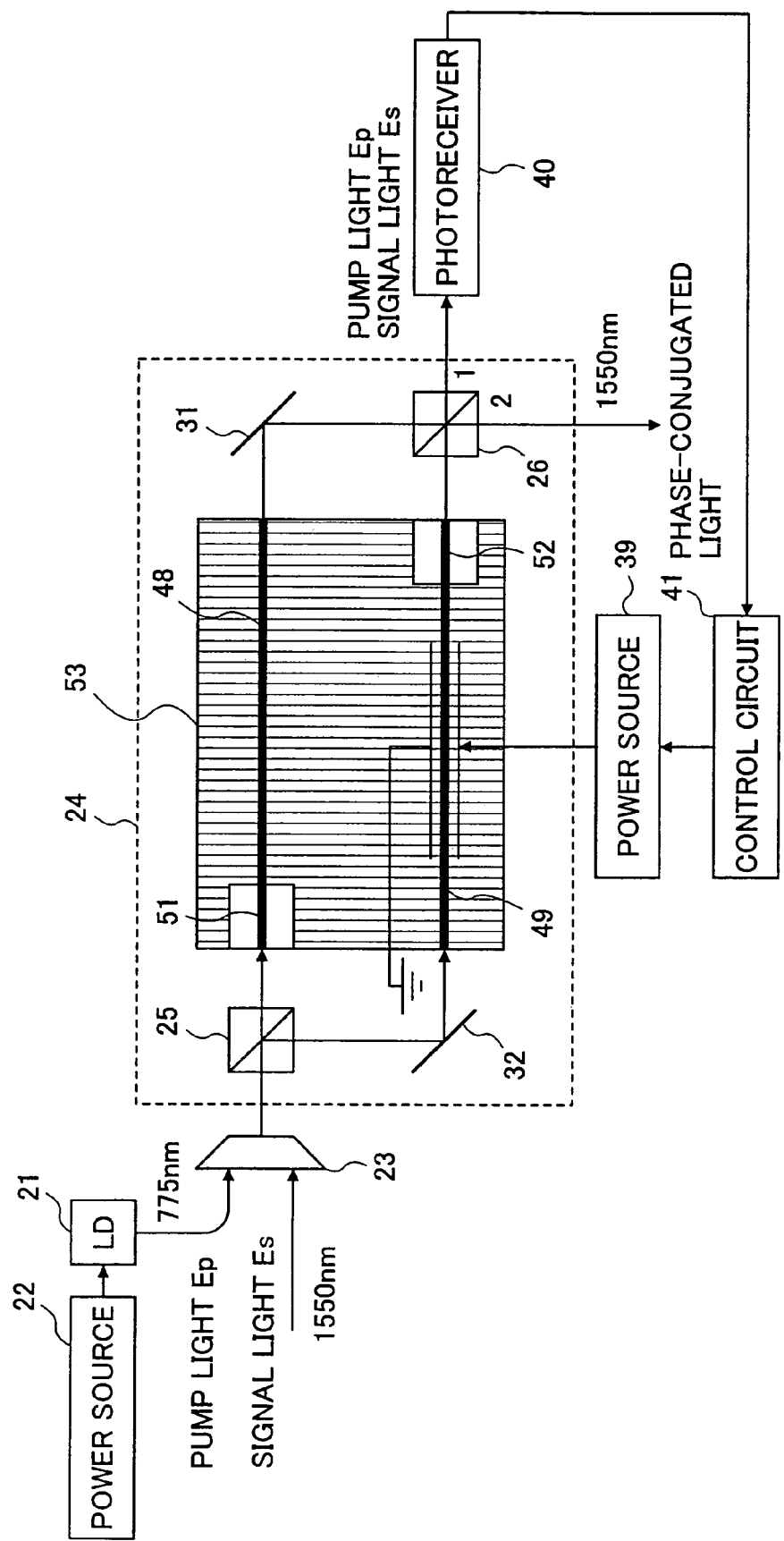
FIG. 9 shows a sixth embodiment of the optical parametric circuit of the present invention.

FIG. 9 shows a sixth embodiment of the optical parametric circuit of the present invention. In this embodiment, a configuration of the optical parametric circuit will be described in which the wavelength of the signal light is 1550 nm, the wavelength of the pump light is 775 nm which corresponds to second-order harmonic wave of the signal light, and phase-conjugated light which has the same wavelength as that of the input signal light is output.

The basic configuration of this embodiment is almost the same as that of the fourth embodiment except that, in this embodiment, phase mismatched LiNbO₃ waveguides 51, 52 as the optical dispersive medium and the quasi-phase matched LiNbO₃ waveguides 48, 49 as the second-order optical nonlinear medium are formed monolithically on an LiNbO₃ substrate 53. As was described in the fourth embodiment, difference of propagation coefficient between the pump light and the signal light in a normal LiNbO₃ waveguide is large. In this embodiment, this characteristic is used for realizing the optical dispersive medium, which is the phase mismatched LiNbO₃ waveguides 51, 52. Accordingly, the optical dispersive medium and the optical nonlinear medium can be accumulated. Thus, a coupling loss and the like can be decreased comparing with the fourth embodiment, and, it becomes possible to reduce cost by reducing number of optical circuit parts so that the optical parametric circuit of the present invention is suitable for mass production.

In addition, like the second embodiment, for compensating for the optical path-length error of the nonlinear Mach-Zehnder Interferometer 24, the optical parametric circuit of this embodiment includes the power source 39 which apply voltage to the second-order optical nonlinear medium, the photoreceiver 40 which monitors the pump light power and the control circuit 41 such that the power source 39 obtains feedback from the control circuit 41. Accordingly, the wavelength-converted light can be output from the output port 2 and a robust system can be realized against manufacturing error of the nonlinear Mach-Zehnder interferometer 24.

The wavelength conversion efficiency $\eta_{PD}$ by using the quasi-phase matched LiNbO₃ waveguides 48, 49 as the second-order optical nonlinear medium becomes about 1.66 (2.2 dB) under the same condition as the fourth embodiment. In this case, amplification of the phase-conjugated light is also possible.

The length $L_d$ of the phase mismatched LiNbO₃ waveguides 51, 52 can be calculated as follows, wherein the length $L_d$ is a key for separating the signal light and the generated phase-conjugated light completely at the output stage of the optical parametric circuit. The refractive index of the phase mismatched LiNbO₃ waveguides 51, 52 is $n(\lambda_p)=2.26$ for pump light wavelength $\lambda_p=775$ nm and $n(\lambda_s)=2.22$ for signal light wavelength $\lambda_s=1550$ nm. Thus, according to the equation (11), $$\Delta \beta L_d = (\beta(\omega_P) - \beta(\omega_S) - \beta(\omega_P - \omega_S))L_d \quad (19)$$
$$= 2\pi(n(\lambda_P)/\lambda_P - 2n(\lambda_S)/\lambda_S)L_d$$
$$= 2\pi(2.26/(775 \times 10^{-9}) - 2 \times 2.22/(1550 \times 10^{-9}))L_d$$
$$= (2n-1)\pi$$

($n$ is an integer), thus, $L_d=9.7$ µm (n=1) is the condition for separating the signal light and the phase-conjugated light completely. Therefore, by configuring the optical parametric circuit by using the phase mismatched LiNbO₃waveguide of 9.7 µm long as the optical dispersive medium, it becomes possible that the phase-conjugated light which has the same wavelength as the signal light can be separated from the signal light completely and be output from the output port 2.

As optical waveguides used for this embodiment, materials of LiTaO₃, KTP(KLiOPO₄), KDP(KH₂PO₄), KNbO₃ and the like can be used in addition to the LiNbO₃.

Modification 1 of the Sixth Embodiment

As shown in FIG. 6B, the quasi-phase matched LiNbO₃waveguides 48, 49 are formed on the LiNbO₃ substrate 53, on which LiNbO₃ substrate 53 dipole-inversion regions 50 are placed at established intervals between which intervals dipole-noninversion regions are formed. When the length of the dipole-noninversion region of the quasi-phase matched LiNbO₃waveguides 48, 49 is set to be the same as the length $L_d$ of each of the phase mismatched LiNbO₃ waveguides 51, 52, it becomes possible that one of the dipole-noninversion regions of the quasi-phase matched LiNbO₃ waveguides 48, 49 can be used as each of the phase mismatched LiNbO₃ waveguides 51, 52.

Figure 10B:
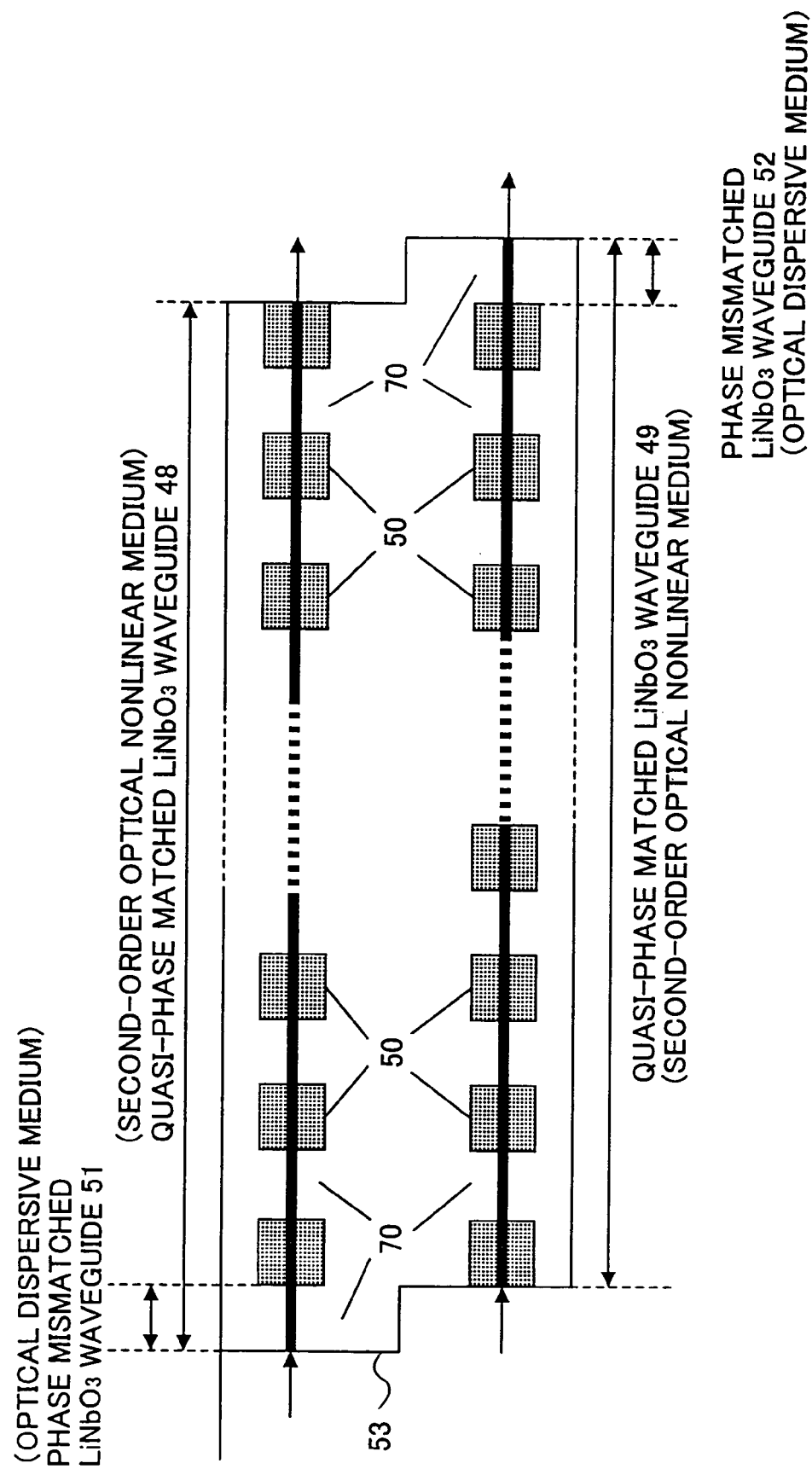

FIGS. 10A and 10B show configuration examples of the optical dispersive medium and the second-order optical nonlinear medium in the modification 1 of the sixth embodiment. In the quasi-phase matched LiNbO₃ waveguides 48, 49 shown in the figures, absolute values of nonlinear-dielectric constant d (used in the equation (4)) for the dipole-inversion regions 50 and the dipole-noninversion regions 70 are the same and the signs of the values are opposite. That is, the lengths of the dipole-inversion regions 50 and the dipole-noninversion regions 70 are the same wherein the length is one-half of dipole-inversion cycle.

As shown in FIG. 10A, in the quasi-phase matched LiNbO$_3$ waveguides 48, 49, the dipole-inversion regions 50 and the dipole-noninversion regions 70 are formed alternately in which the length of each region is 9.7 μm. Accordingly, the first dipole-noninversion region 70 in the quasi-phase matched LiNbO$_3$ waveguide 48 can be used as the phase mismatched LiNbO$_3$ waveguide 51 as 9.7 μm long optical dispersive medium, and the last dipole-noninversion region 70 in the quasi-phase matched LiNbO$_3$ waveguide 49 can be used as the phase mismatched LiNbO$_3$ waveguide 52 as another 9.7 μm long optical dispersive medium. That is, from outward appearances, there is no difference between the optical dispersive medium and the optical nonlinear medium.

In addition, as shown in FIG. 10B, the same effect can be obtained by using an LiNbO$_3$ substrate 53 on which the quasi-phase matched LiNbO$_3$ waveguides 48, 49 are formed by shifting one-half of the dipole-inversion cycle such that the positions of the dipole-inversion region 50 and the dipole-noninversion region 70 between the quasi-phase matched LiNbO$_3$ waveguides 48 and 49 become the same in light traveling direction.

Modification 2 of the Sixth Embodiment

According to the modification 1 of the sixth embodiment, there is an advantage in that it becomes possible that one of the dipole-noninversion regions of the quasi-phase matched LiNbO$_3$ waveguides 48, 49 can be used as each of the phase mismatched LiNbO$_3$ waveguides 51, 52. However, there is a following problem for this case. That is, there is only one wavelength range of the pump light of 780 nm range for heightening the conversion efficiency and for satisfying the phase matching condition, and the one wavelength range is very narrow. Thus, the pump light wavelength or converted wavelength of the wavelength-converted light can not be selected.

That is, as for a quasi-phase matched LiNbO$_3$ waveguide (dipole-inversion waveguide) on which waveguide parts having nonlinear-dielectric constants d and −d are placed alternately as shown in FIG. 11A, only one band of the pump light for heightening the conversion efficiency appears and it is very narrow (about 1 nm) as shown in FIG. 11B.

For solving this problem, there is a method of modulating the dipole-inversion waveguide. By using this method, it becomes possible that the phase matching condition can be satisfied for a plurality of pump light wavelength bands.

For example, a modulation pattern shown as (1) in FIG. 12A is multiplied to a dipole-inversion waveguide in which waveguide parts having nonlinear-dielectric constants d and −d are placed alternately shown as (2) in FIG. 12A. As a result, a dipole-inversion waveguide shown as (3) is obtained. By using this dipole-inversion waveguide, the number of the wavelength ranges of the pump light for satisfying the phase matching condition becomes two as shown in FIG. 12B. In this case, the pump light can be selected from two wavelengths. In the above description, "multiply" means that, for example, when a part of the dipole-inversion waveguide which exists at +1 position of the modulation pattern is d, +1×d is calculated, and, when the part is −d, +1×(−d) is calculated.

Figure 13B:
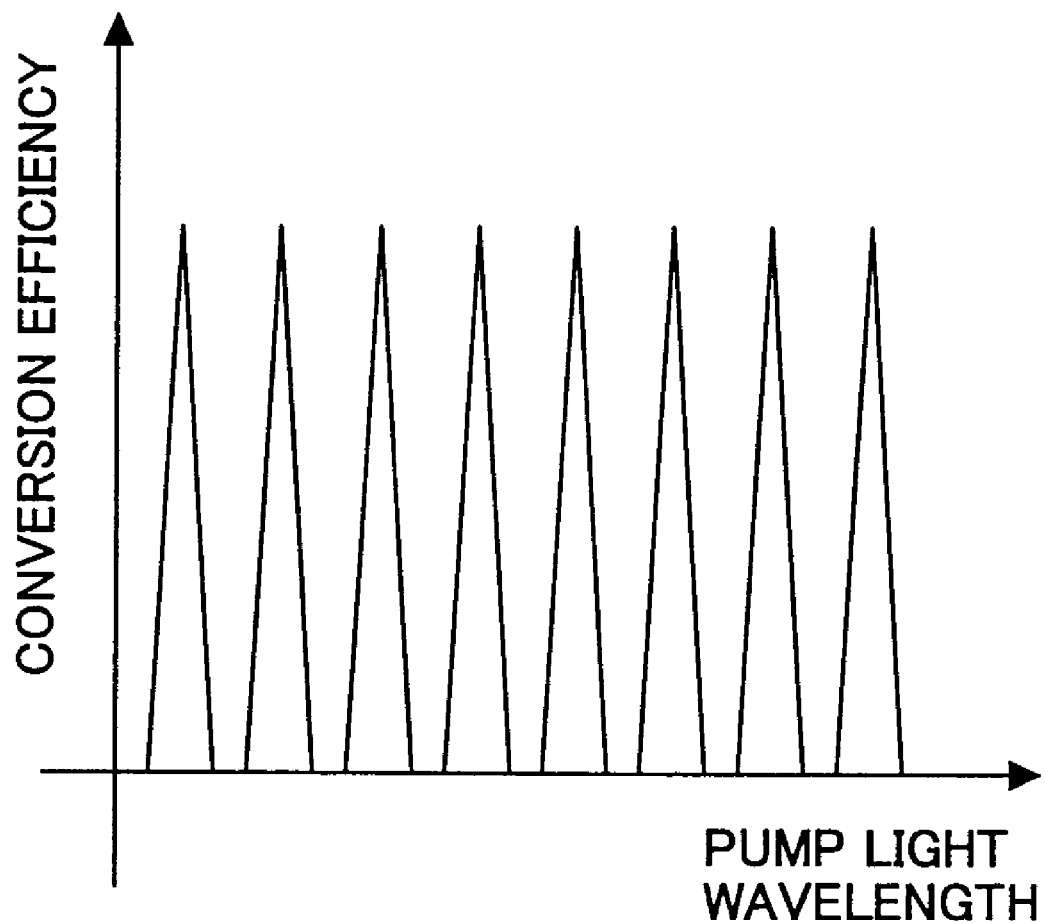

In this embodiment, an example is shown in which the phase matching condition can be satisfied in eight pump light wavelength ranges by performing three-fold modulation as shown in FIG. 13A. The modulation cycles are 14 mm, 7 mm and 3.5 mm respectively. Accordingly, as shown in FIG. 13B, the phase matching wavelengths are formed at 0.8 nm intervals centering on 775 nm which corresponds to the second-order harmonic wave of 1550 nm, that is, the phase matching wavelengths are 772.2, 773.0, 773.8, 774.6, 775.4, 776.2, 777.0 and 777.8 nm.

Figure 14:
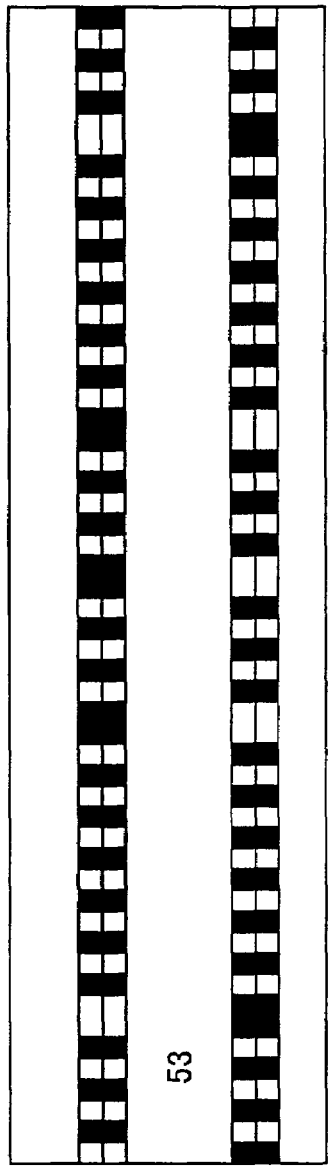
FIG. 14 shows quasi-phase matched $LiNbO_3$ waveguides 48, 49 in modification 2 of the sixth embodiment.

Also in this case, dipole-inversions of the quasi-phase matched LiNbO$_3$ waveguides 48, 49 are opposite each other as shown in FIG. 14.

According to this configuration, by changing the pump light wavelength,-the wavelength of the wavelength-converted light can be changed. For example, by selecting the pump light properly for input signal light of 1550 nm, the wavelength of the wavelength-converted light can be selected from a range of 1515 nm–1585 nm.

Seventh Embodiment

Figure 15:
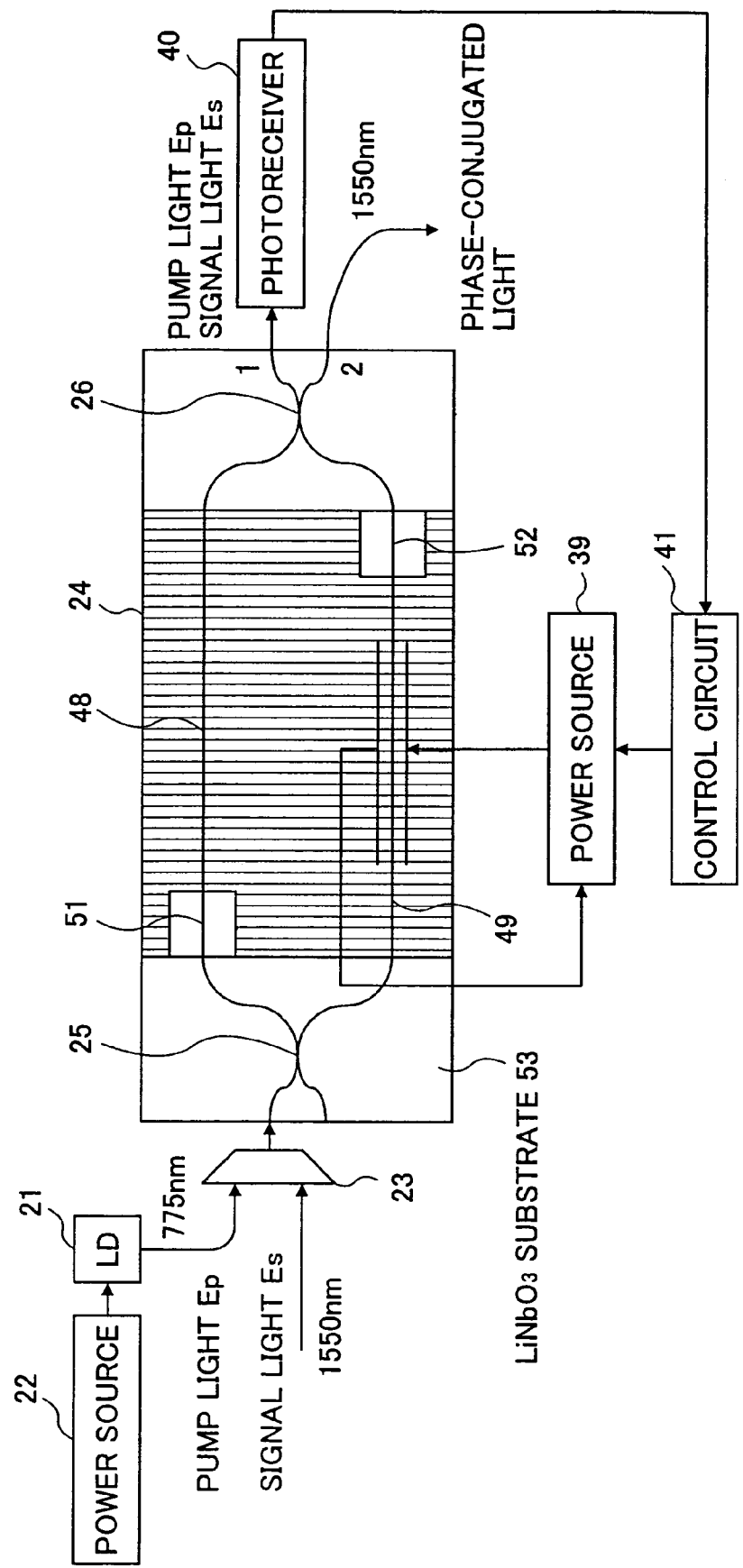
FIG. 15 shows a seventh embodiment of the optical parametric circuit of the present invention.

FIG. 15 shows a seventh embodiment of the optical parametric circuit of the present invention. In this embodiment, a configuration of the optical parametric circuit will be described in which the wavelength of the signal light is 1550 nm, the wavelength of the pump light is 775 nm which corresponds to second-order harmonic wave of the signal light, and phase-conjugated light which has the same wavelength 1550 nm as that of the input signal light is output.

The basic configuration of this embodiment is almost the same as that of the sixth embodiment except that, in this embodiment, the nonlinear Mach-Zehnder interferometer 24 as a whole is configured by optical waveguides on the LiNbO$_3$ substrate 53. That is, optical couplers 25, 26, the phase mismatched LiNbO$_3$ waveguides 51, 52 used as the optical dispersive medium and the quasi-phase matched LiNbO$_3$ waveguides 48, 49 used as the second-order optical nonlinear medium are formed monolithically. Accordingly, while this circuit has the same performance as that of the sixth embodiment, it becomes possible to reduce cost by reducing number of optical circuit parts so that the optical parametric circuit is suitable for mass production.

The wavelength conversion efficiency $\eta_{PD}$ by using the quasi-phase matched LiNbO$_3$ waveguides 48, 49 as the second-order optical nonlinear medium becomes about 1.66 (2.2 dB) under the same condition as the fourth embodiment. In this case, amplification of the phase-conjugated light is also possible.

The length $L_d$ of the phase mismatched LiNbO$_3$ waveguides 51, 52 becomes $L_d$=9.7 μm under the same condition as the sixth embodiment. That is, by configuring the optical parametric circuit by using the phase mismatched LiNbO$_3$ waveguide of 9.7 μm long as the optical dispersive medium, it becomes possible that the phase-conjugated light which has the same wavelength as the signal light can be separated from the signal light completely and be output from the output port 2. In addition, the phase mismatched LiNbO$_3$ waveguides 51, 52 and the quasi-phase matched LiNbO$_3$ waveguides 48, 49 can be configured as shown in FIG. 10A, which holds true for following each embodiment.

As optical waveguides used for this embodiment, materials of LiTaO$_3$, KTP(KLiOPO$_4$) KDP(KH$_2$PO$_4$), KNbO$_3$ and the like can be used in addition to the LiNbO$_3$.

Eighth Embodiment

FIG. 16A shows an eighth embodiment of the optical parametric circuit of the present invention. In this embodiment, a configuration of the optical parametric circuit will be described in which the wavelength of the signal light is 1550 nm, the wavelength of the pump light is 775 nm which corresponds to second-order harmonic wave of the signal light, and phase-conjugated light which has the same wavelength 1550 nm as that of the input signal light is output.

The basic configuration of this embodiment is almost the same as that of the seventh embodiment except that, in this embodiment, the nonlinear Mach-Zehnder interferometer 24 as a whole is configured by optical waveguides on a silica substrate 60. That is, optical couplers 25, 26, the silica optical waveguides 61–64 used as the optical dispersive medium and the quasi-phase matched GaAs/AlGaAs waveguides 65, 66 used as the second-order optical nonlinear medium are formed monolithically. The silica optical waveguides 61–64 are used as the optical dispersive medium because difference of propagation coefficients between the signal light and the pump light is large. From outward appearances, four optical dispersive mediums are placed at both ends of input and output of the optical nonlinear mediums in this embodiment. Each of the difference of the lengths of the silica optical waveguides 61, 62 which are in the input side and the difference of the lengths of the silica optical waveguides 63, 64 which are in the output side functions as the optical dispersive medium for separating the signal light and the phase-conjugated light (wavelength-converted light).

As shown in FIG. 16B, the quasi-phase matched GaAs/AlGaAs waveguides 65, 66 are configured such that dipole-inversion regions in which placement of atoms of Ga and atoms of As are inverted as shown in FIG. 16B are placed cyclically in the direction of the length of the waveguides. A manufacturing process for the waveguides is disclosed, for example, in Japanese Journal of Applied Physics, Shinji Koh et al.,"GaAs/Ge/GaAs Sublattice Reversal Epitaxy on GaAs (100) and (111) Substrates for nonlinear Optical Devices", Jpn. J. Appl. Phys. Vol.38, L508–L511, 1999.

According to this waveguide structure, the effective cross-section area is reduced so that the effect of light confinement of the pump light is heightened, and, phase matching is realized between the pump light and the signal light.

Assuming that the length of the quasi-phase matched GaAs/AlGaAs waveguides 65, 66 is $L_n=1$ mm, the effective cross-section area is $A=12.5$ $\mu m^2$, and the second-order nonlinear-dielectric constant is $d=1\times 10^{-21}$ (MKS) and the refractive index is 3.5, the conversion parameter $\eta_{PD}'$ becomes $$\eta_{PD}' = 1.6 \times 10^{-4} (mW^{-1}cm^{-2}) \quad (20).$$

Thus, when the pump light power is $P_p=500$ mW, the wavelength conversion efficiency $\eta_{PD}$ becomes about 2.7 (1.4 dB). In this case, not only wavelength conversion but also amplification of phase-conjugated light is possible.

The difference $L_d$ of the lengths of the silica optical waveguides 61 and 62 (63 and 64), which is a key for separating the signal light and the generated phase-conjugated light completely at the output stage of the optical parametric circuit, can be calculated as follows. The equivalent refractive index of the silica optical waveguides is $n(\lambda_p)=1.454$ for pump light wavelength $\lambda_p=775$ nm and $n(\lambda_s)=1.444$ for signal light wavelength $\lambda_s=1550$ nm. Thus, according to the equation (11), $$\begin{aligned}\Delta\beta L_d &= (\beta(\omega_P) - \beta(\omega_S) - \beta(\omega_P - \omega_S))L_d \quad (21)\\ &= 2\pi(n(\lambda_P)/\lambda_P - 2n(\lambda_S)/\lambda_S)L_d\\ &= 2\pi(2.26/(775 \times 10^{-9}) - 2 \times 2.22/(1550 \times 10^{-9}))L_d\\ &= (2n-1)\pi\end{aligned}$$

(n is an integer), therefore, $L_d=38.8$ $\mu m$ (n=1) is the condition for separating the signal light and the phase-conjugated light completely.

Therefore, by setting the difference of the lengths of the silica optical waveguides 61, 62 and the difference of the lengths of the silica optical waveguides 63, 64 as an integral multiple of 38.8 $\mu m$, it becomes possible that the phase-conjugated light having the same wavelength as that of the signal light is separated from the input signal light completely and output from the output port 2.

Also in this embodiment, since the optical dispersive medium and the optical nonlinear medium can be accumulated, it becomes possible to reduce cost by reducing number of optical circuit parts so that the optical parametric circuit of the present invention is suitable for mass production.

As quasi-phase matched optical waveguides which form the optical nonlinear medium, materials of GaN family semiconductor, ZnSSe family semiconductor, $LiNbO_3$, $LiTaO_3$, KTP($KLiOPO_4$), KDP($KH_2PO_4$), $KNbO_3$ and the like can be used in addition to the GaAs/AlGaAs semiconductor. In addition, as substrates materials, Si, Ge, GaN and ZnSe semiconductors can be used.

Ninth Embodiment

Each of embodiments from second to eighth includes the power source 39(47), the photoreceiver 40 monitoring the pump light power and the control circuit 41 such that the power source 39(47) obtains feedback from the control circuit 41 for compensating for the optical path-length error of the two optical paths of the nonlinear Mach-Zehnder interferometer 24. Accordingly, the phase-conjugated light (wavelength-converted light) can be output from the output port 2. On the other hand, the ninth embodiment does not need such compensation for the optical path-length error of the nonlinear Mach-Zehnder interferometer by using a nonlinear loop mirror (nonlinear Sagnac interferometer).

Figure 17:
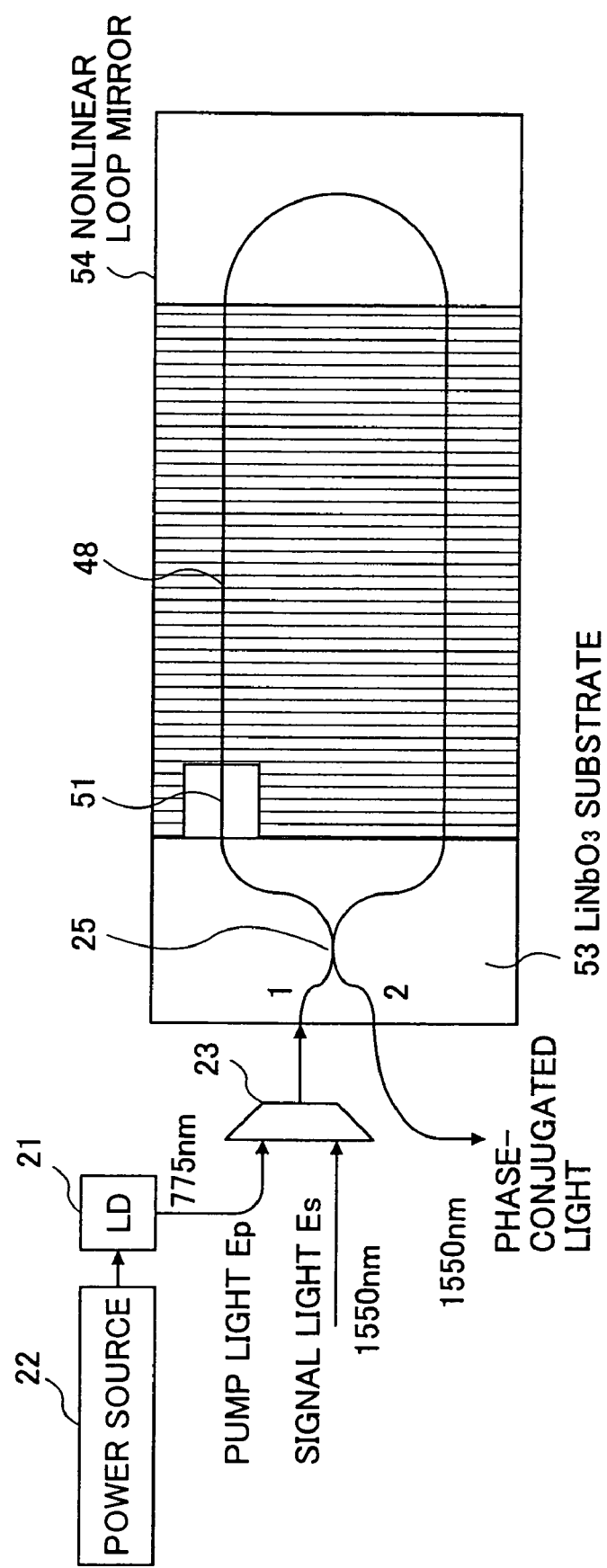
FIG. 17 shows a ninth embodiment of the optical parametric circuit of the present invention.

FIG. 17 shows the ninth embodiment of the optical parametric circuit of the present invention. In this embodiment, a configuration of the optical parametric circuit will be described in which the wavelength of the signal light is 1550 nm, the wavelength of the pump light is 775 nm which corresponds to second-order harmonic wave of the signal light, and phase-conjugated light which has the same wavelength 1550 nm as that of the input signal light is output.

The basic configuration of this embodiment is almost the same as that of the seventh embodiment except that, in this embodiment, the nonlinear loop mirror 54 is used instead of the nonlinear Mach-Zehnder interferometer 24. The nonlinear loop mirror 54 is configured such that two ports of the optical coupler 25 are connected via the phase unmatched $LiNbO_3$ waveguide 51 used as the optical dispersive medium and the quasi-phase matched $LiNbO_3$ waveguide 48 used as the second-order optical nonlinear medium like a loop. That is, in the right-handed optical path, the phase mismatched $LiNbO_3$ waveguide 51 and the quasi-phase matched $LiNbO_3$ waveguide 48 are connected in this order. In the left-handed optical path, the quasi-phase matched $LiNbO_3$ waveguide 48 and the phase mismatched $LiNbO_3$ waveguide 51 are connected in this order. Each of the right-handed optical path and the left-handed optical path corresponds to one of the two optical paths in the nonlinear Mach-Zehnder interferometer. However, in this embodiment, since light in the right-handed direction and light in the left-handed direction travel in the same optical path, the optical path length error which occurs between the two optical path in the nonlinear Mach-Zehnder interferometer does not occur. Thus, compensation for the error is not necessary in this embodiment.

The wavelength conversion efficiency $\eta_{PD}$ by using the quasi-phase matched $LiNbO_3$ waveguide 48 as the second-order optical nonlinear medium becomes about 1.66(2.2 dB) under the same condition as the fourth embodiment. In this case, amplification of the phase-conjugated light is also possible.

The length $L_d$ of the phase mismatched LiNbO$_3$ waveguide 51 used as the optical dispersive medium becomes $L_d$=9.7 μm under the same condition as the sixth embodiment. That is, by configuring the optical parametric circuit by using the phase mismatched LiNbO$_3$ waveguide of 9.7 μm long as the optical dispersive medium, it becomes possible that the phase-conjugated light which has the same wavelength as the signal light can be separated from the signal light completely and be output from the output port 2.

In addition, in the above-mentioned configuration, when the signal light and the pump light are applied to the two input ports of the optical coupler 25 respectively, the signal light is output from the output port 1, and the phase-conjugated light and the pump light are output from the output port 2. Also in this case, since the wavelength difference between the phase-conjugated light and the pump light is large, these can be easily separated.

A configuration using the nonlinear loop mirror 54 instead of the nonlinear Mach-Zehnder interferometer 24 can be adopted not only for the seventh embodiment but also other embodiments. In the configuration using the nonlinear loop mirror 54, since input and output ports for the signal light and the phase-conjugated light become the same, an optical isolator or an optical circulator is used (which is not shown in FIG. 17).

Tenth Embodiment

Figure 18B:
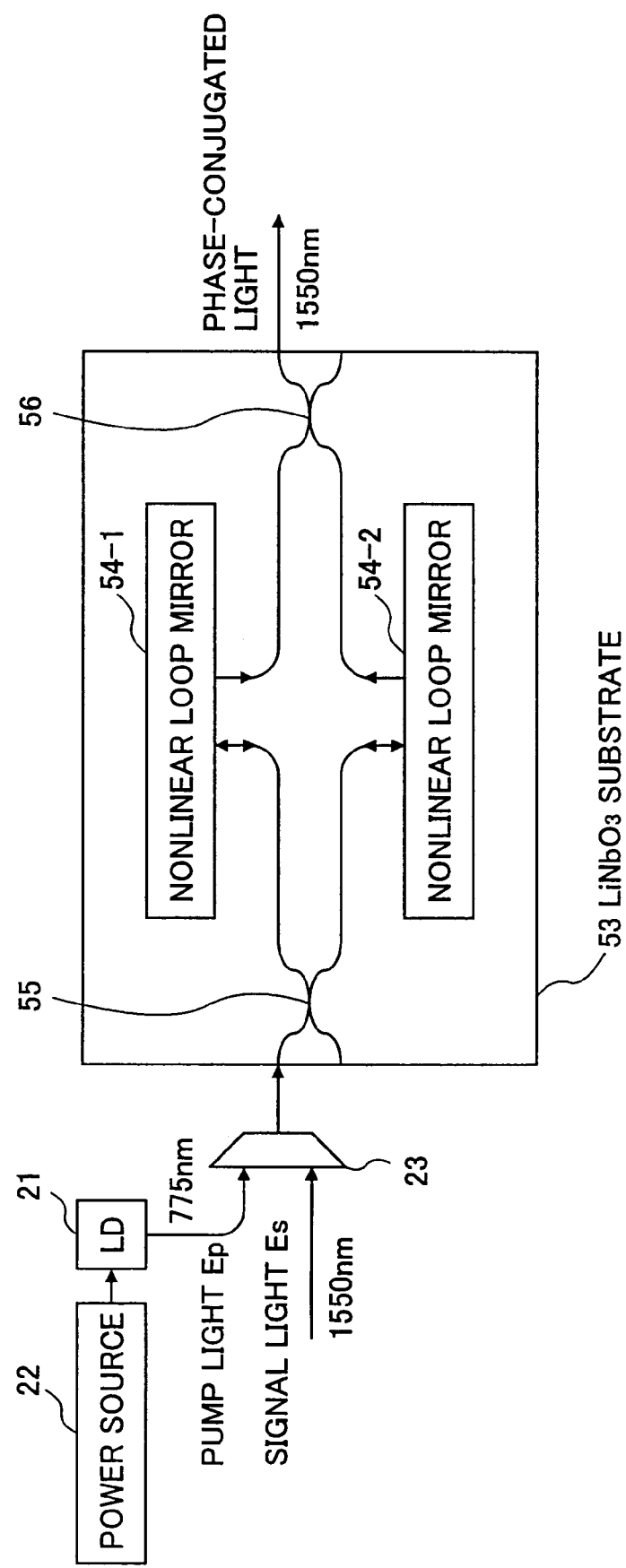

FIGS. 18A and 18B show a tenth embodiment of the optical parametric circuit of the present invention. In this embodiment, a configuration of the optical parametric circuit will be described in which the wavelength of the signal light is 1550 nm, the wavelength of the pump light is 775 nm which corresponds to second-order harmonic wave of the signal light, and phase-conjugated light which has the same wavelength 1550 nm as that of the input signal light is output.

In the embodiment shown in FIG. 18A, two sets of the nonlinear Mach-Zehnder interferometers 24 including the optical path length control system of the seventh embodiment are arranged between polarization multiplexers 55 and 56 formed on the LiNbO$_3$ substrate 53. The polarization multiplexer 55 separates the signal light and the pump light into p polarization component and s polarization component which are applied to nonlinear Mach-Zehnder interferometers 24-1, 24-2 respectively. Then, phase-conjugated lights of the p polarization component and the s polarization component which are output from the nonlinear Mach-Zehnder interferometers 24-1, 24-2 are synthesized in the polarization multiplexer 56 and output. According to this structure, an optical parametric circuit of a polarization-independent type which outputs constant phase-conjugated light irrespective of polarization state of input signal light can be realized.

The wavelength conversion efficiency $\eta_{PD}$ in the second-order optical nonlinear medium and the length $L_d$ of the optical dispersive medium are the same as those of the seventh embodiment. In addition, instead of the nonlinear Mach-Zehnder interferometers 24-1 and 24-2, the nonlinear loop mirror 54 of the ninth embodiment can be used as shown in FIG. 18B.

As optical waveguides used for this embodiment, materials of LiTaO$_3$, KTP(KLiOPO$_4$), KDP(KH$_2$PO$_4$), KNbO$_3$ and the like can be used in addition to the LiNbO$_3$.

Eleventh Embodiment

Figure 19:
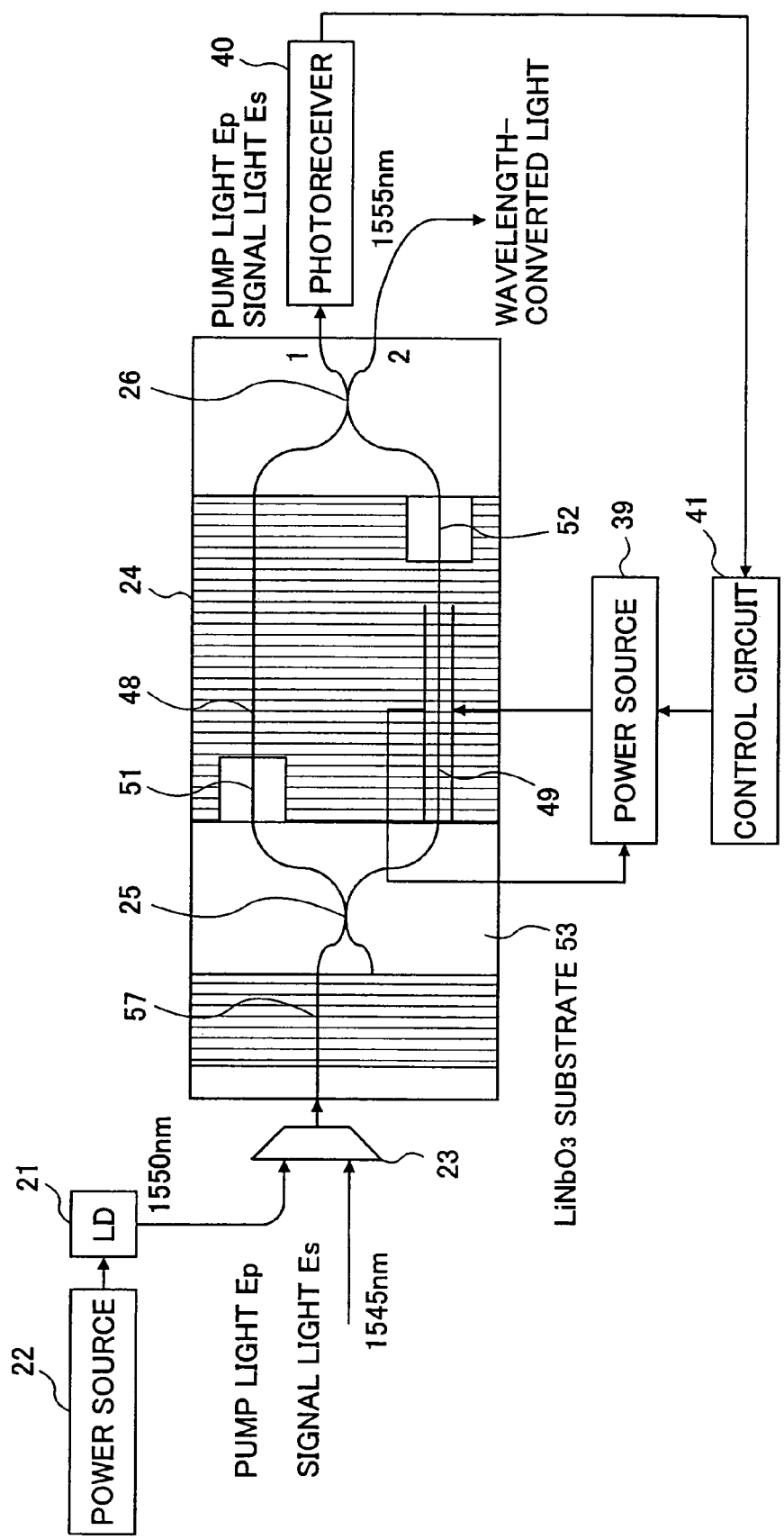
FIG. 19 shows an eleventh embodiment of the optical parametric circuit of the present invention.

FIG. 19 shows an eleventh embodiment of the optical parametric circuit of the present invention. In this embodiment, a configuration of the optical parametric circuit will be described in which the wavelength of the signal light is 1545 nm, the wavelength of the pump light is 1550 nm, and wavelength-converted light of 1555 nm is output.

The basic configuration of this embodiment is almost the same as that of the seventh embodiment except that, in this embodiment, the pump light wavelength is in the wavelength range of the signal light, and that the pump light of 1550 nm is converted into 775 nm (optical cascading) in the second-order optical nonlinear medium, after that, the wavelength-converted light is generated by the same process as the seventh embodiment. In the seventh embodiment, since difference of the wavelengths between the signal light and the pump light is large, it is difficult to couple both lights to fundamental waveguide mode of the optical parametric circuit simultaneously. On the other hand, according to the present embodiment in which the optical cascading is used, since the wavelengths of the signal light and the pump light are in the same range, it becomes easy to couple both lights to fundamental waveguide mode of the optical parametric circuit.

In this embodiment, since the pump light of the wavelength 1550 nm is converted into the wavelength 775 nm by SHG process, conversion efficiency for the pump light power decreases. In addition, a quasi-phase matched LiNbO$_3$ waveguide 57 used as the second-order optical nonlinear medium for the optical cascading is provided at the front of the optical coupler 25 of the nonlinear Mach-Zehnder interferometer 24. That is, a mixed light of the signal light and the pump light is applied to the quasi-phase matched LiNbO$_3$ waveguide 57, and the signal light of 1545 nm and the pump light in which the wavelength is converted to 775 nm are applied to the optical coupler 25.

Here, the pump light of the wavelength 1550 nm and pump light power $P_p$=1000 mW is converted into the pump light of the wavelength 775 nm and pump light power 800 mW by the quasi-phase matched LiNbO$_3$ waveguide 57 of $L_n$=5 cm long. The pump light and the signal light are divided into two by the optical coupler 25. In one optical path, the divided light is applied to the quasi-phase matched LiNbO$_3$ waveguide 48 via the phase mismatched LiNbO$_3$ waveguide 51 so that the wavelength-converted light is generated. In the other optical path, the pump light and the signal light are applied to the quasi-phase matched LiNbO$_3$ waveguide 49 so that the wavelength-converted light is generated, in addition, the lights are applied to the phase mismatched LiNbO$_3$ waveguide 52. Then, the signal light and the pump light, and the wavelength-converted light are separated by the optical coupler 26 and output from different output ports.

Assuming that the length of the quasi-phase matched LiNbO$_3$ waveguides 48, 49 is $L_n$=6 cm, the effective cross-section area is A=50 μm$^2$, and the second-order nonlinear-dielectric constant is d=5×10$^{-23}$ (MKS), the conversion parameter $\eta_{PD}'$ becomes 9.2×10$^{-5}$(mW$^{-1}$cm$^{-2}$) according to the equation (18). When the power of the pump light of 775 nm is $P_p$=800 mW, the wavelength conversion efficiency $\eta_{PD}$ becomes about 0.33(−4.8 dB).

The length $L_d$ of the phase mismatched LiNbO$_3$ waveguides 51, 52 used as the optical dispersive medium becomes $L_d$=9.7 μm under the same condition as the sixth embodiment. That is, by configuring the optical parametric circuit by using the phase mismatched LiNbO$_3$ waveguide of 9.7 μm long as the optical dispersive medium, it becomes possible that the phase-conjugated light which has the same wavelength as the signal light can be separated from the signal light completely and be output from the output port 2.

The configuration using the optical cascading according to this embodiment can be applied to the polarization-independent type optical parametric circuit using the two nonlinear Mach-Zehnder interferometers shown in the tenth embodiment. This holds true for following embodiments.

As optical waveguides used for this embodiment, materials of LiTaO$_3$, KTP(KLiOPO$_4$), KDP(KH$_2$PO$_4$), KNbO$_3$ and the like can be used in addition to the LiNbO$_3$.

Twelfth Embodiment

Figure 20:
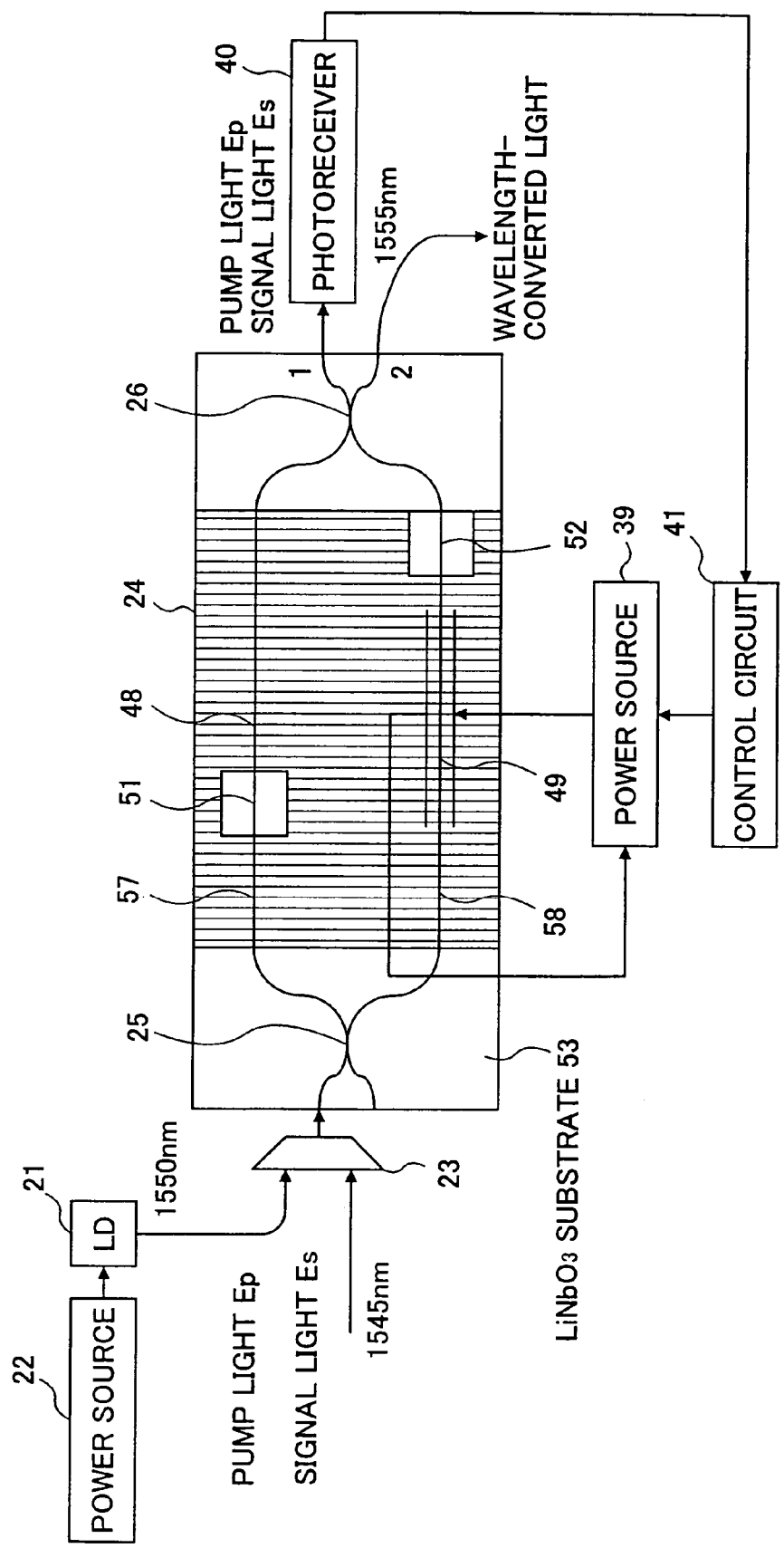
FIG. 20 shows a twelfth embodiment of the optical parametric circuit of the present invention.

FIG. 20 shows a twelfth embodiment of the optical parametric circuit of the present invention. In this embodiment, a configuration of the optical parametric circuit will be described in which the wavelength of the signal light is 1545 nm, the wavelength of the pump light is 1550 nm, and wavelength-converted light of 1555 nm is output.

The basic configuration of this embodiment is almost the same as that of the eleventh embodiment except that, in this embodiment, the quasi-phase matched LiNbO$_3$ waveguides 57, 58 used as the second-order optical nonlinear medium for optical cascading are provided at the front of two optical paths of the nonlinear Mach-Zehnder interferometer 24.

That is, the quasi-phase matched LiNbO$_3$ waveguide 57 is placed between the optical coupler 25 and the phase mismatched LiNbO$_3$ waveguide 51 used as the optical dispersive medium and the quasi-phase matched LiNbO$_3$ waveguide 58 is placed between the optical coupler 25 and the quasi-phase matched LiNbO$_3$ waveguide 49 used as the second-order optical nonlinear medium. The quasi-phase matched LiNbO$_3$ waveguides 49, 58 form one waveguide substantially.

Here, the pump light of the wavelength 1550 nm and pump light power $P_p$=1000 mW is divided into two optical paths by the optical coupler 25 and is converted into the pump light of the wavelength 775 nm and total power 800 mW by the quasi-phase matched LiNbO$_3$ waveguides 57, 58 of $L_n$=5 cm long. In one optical path, the pump light and the signal light are applied to the phase mismatched LiNbO$_3$ waveguide 51 and are applied to the quasi-phase matched LiNbO$_3$ waveguide 48 so that the wavelength-converted light is generated. In the other optical path, the pump light and the signal light are applied to the quasi-phase matched LiNbO$_3$ waveguide 49 so that the wavelength-converted light is generated, in addition, the lights are applied to the phase mismatched LiNbO$_3$ waveguide 52. Then, the signal light and the pump light, and the wavelength-converted light are separated by the optical coupler 26 and output from different output ports.

Here, the wavelength conversion efficiency $\eta_{PD}$ for the quasi-phase matched LiNbO$_3$ waveguides 48, 49 used as the optical nonlinear medium, and the length $L_d$ of the phase mismatched LiNbO$_3$ waveguides 51, 52 used as the optical dispersive medium are the same as those of the eleventh embodiment.

Modification of the Twelfth Embodiment

Figure 21:
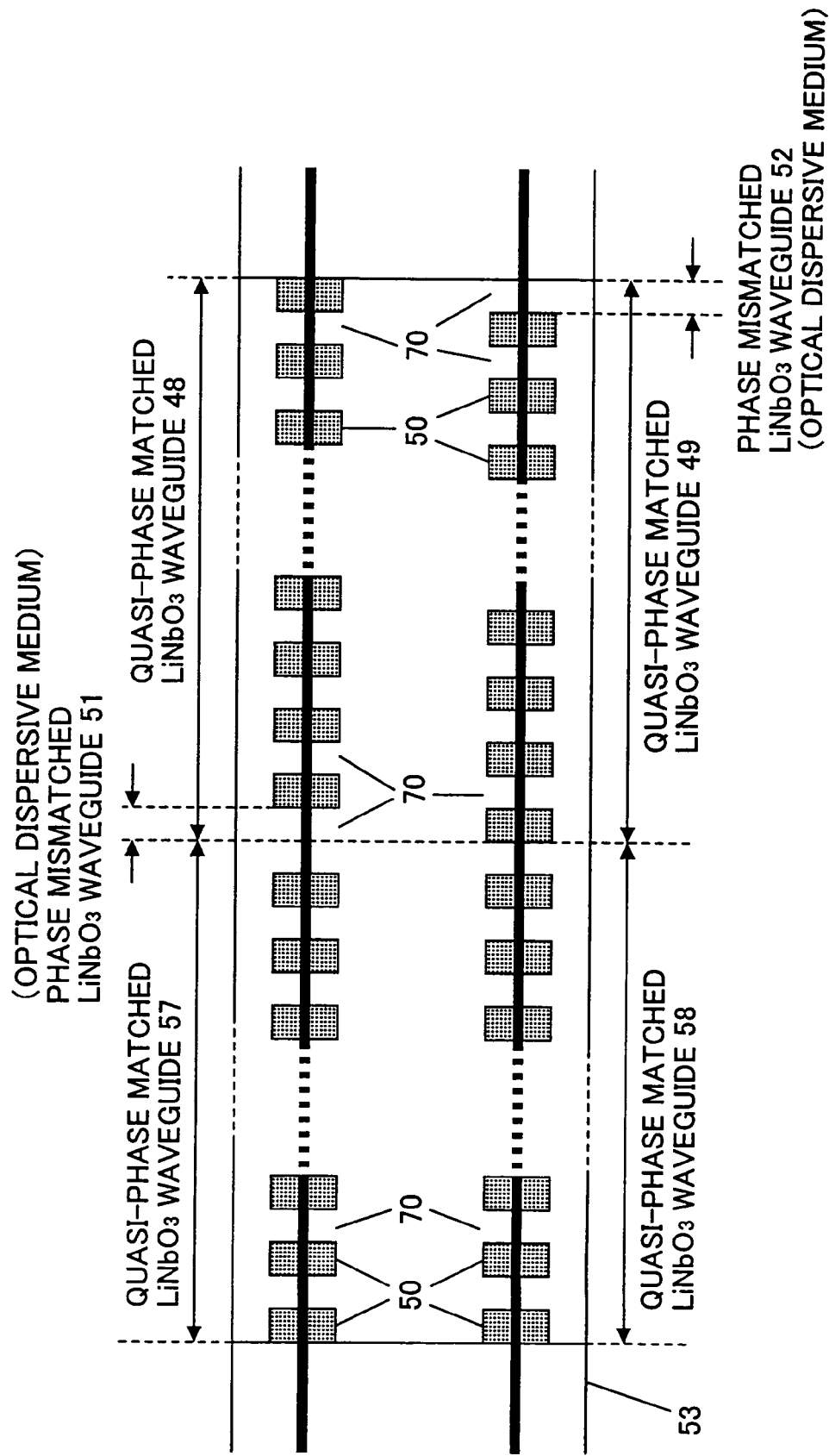
FIG. 21 shows a configuration example 1 of the optical dispersive medium and the second-order optical nonlinear medium in the twelfth embodiment.
Figure 22B:
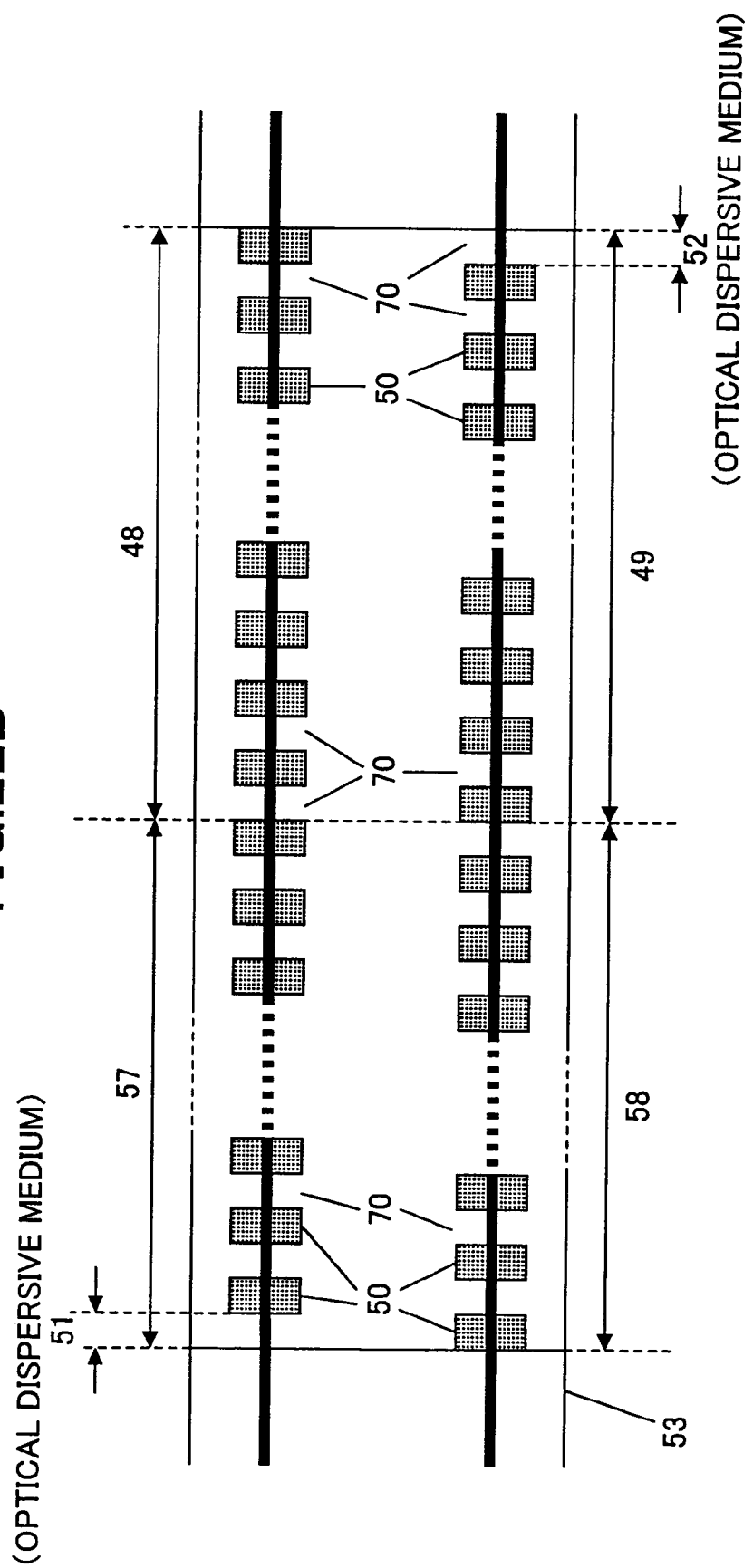

FIG. 21 shows a configuration example 1 of the optical dispersive medium and the second-order optical nonlinear medium in the twelfth embodiment. FIGS. 22A and 22B show configuration examples 2 of the optical dispersive medium and the second-order optical nonlinear medium in the twelfth embodiment.

As for configurations shown in the figures, in the quasi-phase matched LiNbO$_3$ waveguides 57, 58 used as the second-order optical nonlinear medium for optical cascading and the quasi-phase matched LiNbO$_3$ waveguides 48, 49 used as the second-order optical nonlinear medium for generating the wavelength-converted light, absolute values of nonlinear-dielectric constant d (used in the equation (4)) for the dipole-inversion regions 50 and the dipole-noninversion regions 70 are the same and the signs of the values are opposite. That is, the lengths of the dipole-inversion region 50 and the dipole-noninversion region 70 are the same wherein the length is one-half of dipole-inversion cycle.

As shown in FIGS. 21 and 22A, in the quasi-phase matched LiNbO$_3$ waveguides 48, 49, the dipole-inversion regions 50 and the dipole-noninversion regions 70 are formed alternately in which the length of each region is 9.7 μm. Accordingly, the first dipole-noninversion region 70 in the quasi-phase matched LiNbO$_3$ waveguide 48 can be used as the phase mismatched LiNbO$_3$ waveguide 51 as 9.7 μm long optical dispersive medium, and the last dipole-noninversion region 70 in the quasi-phase matched LiNbO$_3$ waveguide 49 can be used as the phase mismatched LiNbO$_3$ waveguide 52 as another 9.7 μm long optical dispersive medium. That is, from outward appearances, there is no difference between the optical dispersive medium and the optical nonlinear medium.

While the FIG. 21 shows a configuration in which the positions of the dipole-inversion regions 50 and the dipole-noninversion regions 70 between the quasi-phase matched LiNbO$_3$ waveguides 57 and 58 become the same in light traveling direction, as shown in FIG. 22A, the dipole-inversion regions 50 and the dipole-noninversion regions 70 can be placed alternately also in the quasi-phase matched LiNbO$_3$ waveguides 57 and 58.

In addition, as a modification of the configuration shown in the FIG. 22A, the first dipole-noninversion region 70 of the quasi-phase matched LiNbO$_3$ waveguide 57 can be used as the phase mismatched LiNbO$_3$ waveguide 51 used as one optical dispersive medium as shown in FIG. 22B.

Thirteenth Embodiment

FIG. 23 shows a thirteenth embodiment of the optical parametric circuit of the present invention. In this embodiment, a configuration of the optical parametric circuit will be described in which the wavelength of the signal light is 1545 nm, the wavelength of the pump light is 1550 nm, and wavelength-converted light of 1555 nm is output.

The basic configuration of this embodiment is almost the same as that of the ninth embodiment except that, in this embodiment, the pump light wavelength is in the wavelength range of the signal light, and that the pump light of 1550 nm is converted into 775 nm (optical cascading) in the second-order optical nonlinear medium, after that, the wavelength-converted light is generated by the same process as the ninth embodiment. That is, the quasi-phase matched LiNbO$_3$ waveguide 57 used as the second-order optical nonlinear medium for optical cascading is provided at the front of the optical coupler 25 of the nonlinear loop mirror

54. A mixed light of the signal light and the pump light is applied to the quasi-phase matched LiNbO$_3$ waveguide 57, and the signal light of 1545 nm and the pump light in which the wavelength is converted to 775 nm are applied to the optical coupler 25.

The wavelength conversion efficiency $\eta_{PD}$ by using the quasi-phase matched LiNbO$_3$ waveguide 48 as the second-order optical nonlinear medium becomes about 1.66(2.2dB) under the same condition as the fourth embodiment. In this case, amplification of the wavelength-converted light is also possible.

The length L$_d$ of the phase mismatched LiNbO$_3$ waveguide 51 used as the optical dispersive medium becomes L$_d$=9.7 µm under the same condition as the sixth embodiment. That is, by configuring the optical parametric circuit by using the phase mismatched LiNbO$_3$ waveguide of 9.7 µm long as the optical dispersive medium, it becomes possible that the wavelength-converted light of 1555 nm can be separated from the signal light completely and be output from the output port 2.

Fourteenth Embodiment

Figure 24:
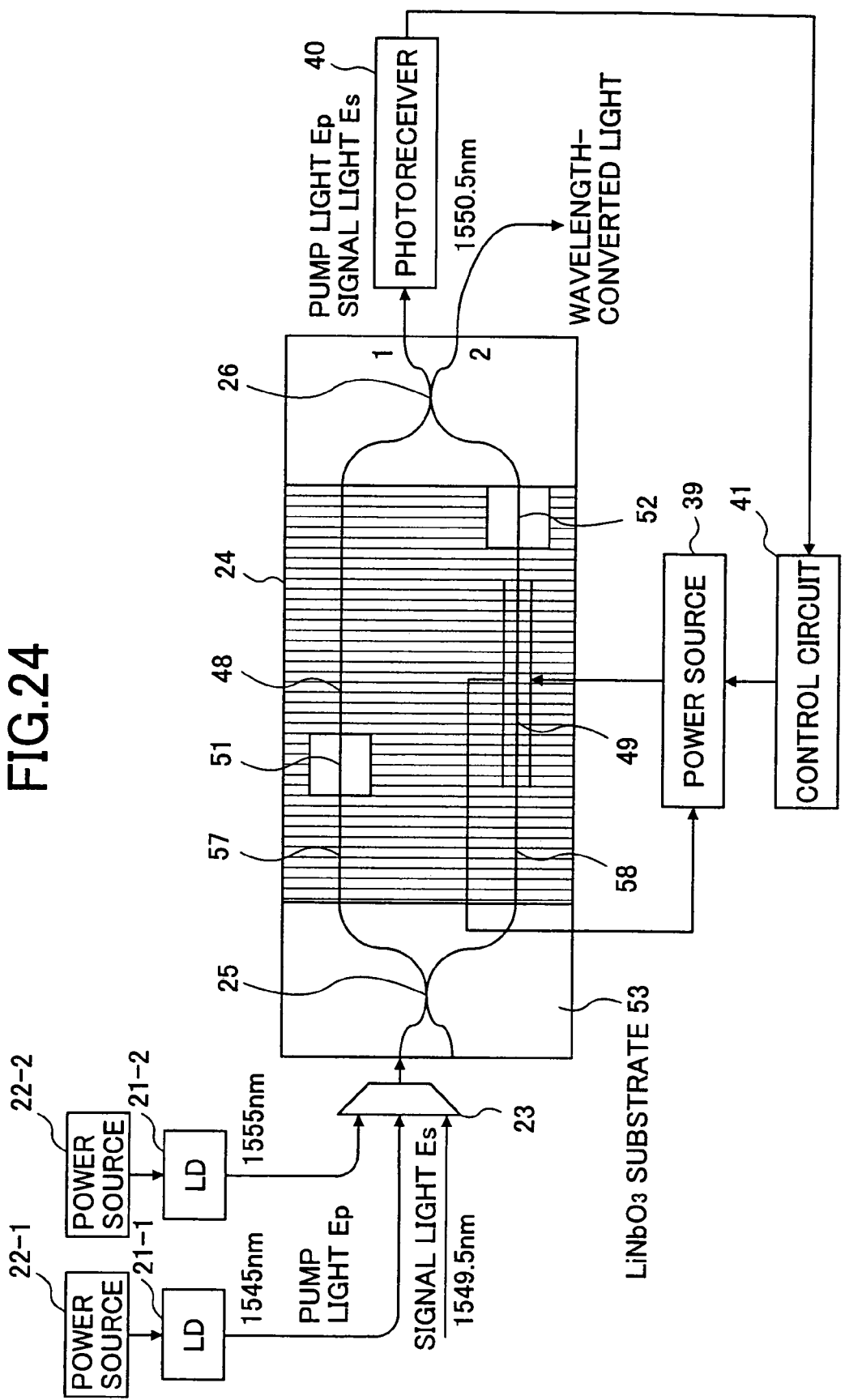
FIG. 24 shows a fourteenth embodiment of the optical parametric circuit of the present invention.

FIG. 24 shows a fourteenth embodiment of the optical parametric circuit of the present invention. In this embodiment, a configuration of the optical parametric circuit will be described in which the wavelength of the signal light is 1549.5 nm, the wavelengths of the pump lights are 1545 nm and 1555 nm, and wavelength-converted light of 1550.5 nm is output.

The basic configuration of this embodiment is almost the same as that of the twelfth embodiment except that, in this embodiment, two wavelengths are used as the pump lights, and that the pump lights of wavelengths 1545 nm and 1555 nm are coupled and converted into 775 nm (optical cascading) in the second-order optical nonlinear medium. After that, the wavelength-converted light of 1550.5 nm can be generated by the same process as the twelfth embodiment. When, as the pump lights, two waves in which the wavelength of the signal light exists in the center of the two waves are used, phase-conjugated light having the same wavelength as the signal light wavelength can be output.

As optical waveguides used for this embodiment, materials of LiTaO$_3$, KTP(KLiOPO$_4$), KDP(KH$_2$PO$_4$), KNbO$_3$ and the like can be used in addition to the LiNbO$_3$.

As mentioned above, according to the present invention, since the optical parametric circuit uses the nonlinear Mach-Zehnder interferometer or the nonlinear loop mirror in which the optical dispersive medium and the second-order optical nonlinear medium are combined, the signal light and the pump light, and the wavelength-converted light (or the phase-conjugated light) can be separated and output irrespective of difference of wavelengths. Accordingly, the optical filter for cutting input signal light which is necessary for conventional optical parametric wavelength conversion becomes unnecessary. In addition, since guard band necessary for filtering becomes also unnecessary, given wavelength space can be used efficiently.

Further, when the phase-conjugated light is generated, the phase-conjugated light which has the same wavelength as that of the input signal light can be generated and these lights can be completely separated. By applying the presented invention to an optical transmission system, spreading of signal optical spectrum due to fiber nonlinear effect, which is a problem in optical fiber transmission, can be suppressed. Accordingly, transmission possible distance can be further increased and transmission quality can be further improved.

In addition, by adjusting the pump light power, the length of the optical nonlinear medium and the like properly, optical parametric amplification can be performed for the wavelength-converted light (or the phase-conjugated light) with respect to the input signal light.

Further, since the optical parametric circuit of the present invention can convert wavelengths at high speed, it can be used as a The present invention is not limited to the specifically disclosed embodiments, and variations and the scope of the invention.

What is claimed is:

1. An optical parametric circuit comprising:
    an optical coupler including a first output port and a second output port; and
    a nonlinear loop mirror on which an optical path which connects said first output port and said second output port is formed;
    wherein said nonlinear loop mirror includes an optical dispersive medium and a second-order optical nonlinear medium through which said optical path passes, and
    wherein an order of placement of said optical dispersive medium and said second-order optical nonlinear medium on said optical path in one direction from said first output port to said second output port is the reverse of an order of placement of said optical dispersive medium and said second-order optical nonlinear medium on said optical path in another direction from said second output port to said first output port.

2. The optical parametric circuit as claimed in claim 1, wherein a mixed light of a signal light and a pump light is applied to an input port of said optical coupler, and a wavelength-converted light or a phase-conjugated light for said input signal light is output from another input port of said optical coupler.

3. The optical parametric circuit as claimed in claim 1, wherein a signal light is input to and output from one input port of said optical coupler, a pump light is input to and output from another input port of said optical coupler, and a wavelength-converted light or a phase-conjugated light for said input signal light is output from said another input port of said optical coupler.

4. The optical parametric circuit as claimed in claim 1, wherein said second-order optical nonlinear medium is formed as an optical waveguide.

5. The optical parametric circuit as claimed in claim 4, wherein said second-order optical nonlinear medium is quasi-phase matched.

6. The optical parametric circuit as claimed in claim 1, wherein said optical dispersive medium and said second-order optical nonlinear medium are formed as an optical waveguide formed on a substrate of a second-order optical nonlinear medium; and
    each function of said optical dispersive medium and said second-order optical nonlinear medium is realized by structural parameters of said optical waveguide.

7. The optical parametric circuit as claimed in claim 6, wherein said optical coupler is formed as said optical waveguide formed on said substrate of said second-order optical nonlinear medium.

8. The optical parametric circuit as claimed in claim 1, wherein wavelength difference between a signal light and a pump light which are to be applied to said nonlinear loop mirror is within 150 nm; and
    said optical parametric circuit further comprising an SHG part which generates second-order harmonic wave from said pump light by SHG process and applies said second-order harmonic wave to a nonlinear Mach-Zehnder interferometer.

9. The optical parametric circuit as claimed in claim 8, wherein two pump lights in which wavelength difference between said signal light and each of said two pump lights is within 150 nm are used.

10. The optical parametric circuit as claimed in claim 1, further comprising a pump light source which generates a pump light to be applied to said nonlinear loop mirror.

11. An optical parametric circuit comprising:

two optical parametric circuits each of the optical parametric circuits including:

an optical coupler including a first output port and a second output port;

a nonlinear loop mirror on which an optical path which connects said first output port and said second output port is formed;

wherein said nonlinear loop mirror includes an optical dispersive medium and a second-order optical nonlinear medium through which said optical path passes, and wherein an order of placement of said optical dispersive medium and said second-order optical nonlinear medium on said optical path in one direction from said first output port to said second output port is the reverse of an order of placement of said optical dispersive medium and said second-order optical nonlinear medium on said optical path in another direction from said second output port to said first output port;

a polarization separation part which separates polarizations of a signal light and a pump light, and applies polarization components to said two optical parametric circuits respectively; and a polarization multiplexing part which polarization-multiplexes polarization components of a wavelength-converted light or a phase-conjugated light which are output from said two optical parametric circuits and outputs multiplexed light.

* * * * *

UNITED STATES PATENT AND TRADEMARK OFFICE
CERTIFICATE OF CORRECTION

| | | |
|---|---|---|
| PATENT NO. | : 7,012,740 B2 | Page 1 of 1 |
| APPLICATION NO. | : 10/983259 | |
| DATED | : March 14, 2006 | |
| INVENTOR(S) | : Imajuku et al. | |

It is certified that error appears in the above-identified patent and that said Letters Patent is hereby corrected as shown below:

On title page Item (56) col 2 line 6

On the face of the patent at OTHER PUBLICATIONS change "Amplifire" to --Amplifier--

Column 2, line 26, change "cho" to --Cho--

Column 5, line 33, change "$\eta'_{PD}$" to --$\eta_{PD}'$--

Column 25, line 12, change "circuits each" to --circuits, each--

Signed and Sealed this

First Day of August, 2006

JON W. DUDAS
*Director of the United States Patent and Trademark Office*